United States Patent
Alpert et al.

(10) Patent No.: US 12,556,889 B2
(45) Date of Patent: Feb. 17, 2026

(54) BLE MULTICAST SERVICE

(71) Applicant: TEXAS INSTRUMENTS INCORPORATED, Dallas, TX (US)

(72) Inventors: Yaron Alpert, Hod Hasharon (IL); Kaian Elmahdy, Ramla (IL); Maxim Altshul, Kadima (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 533 days.

(21) Appl. No.: 17/977,418

(22) Filed: Oct. 31, 2022

(65) Prior Publication Data
US 2024/0147196 A1 May 2, 2024

(51) Int. Cl.
*H04W 4/08* (2009.01)
*H04W 4/06* (2009.01)
*H04W 4/80* (2018.01)

(52) U.S. Cl.
CPC .................................. *H04W 4/08* (2013.01)

(58) Field of Classification Search
CPC ....................................................... H04W 4/08
USPC ......................................................... 370/329
See application file for complete search history.

(56) References Cited

U.S. PATENT DOCUMENTS

| | | | | |
|---|---|---|---|---|
| 6,732,177 B1* | 5/2004 | Roy | ....................... | H04Q 3/005 709/227 |
| 7,263,070 B1* | 8/2007 | Delker | .................. | H04W 8/245 709/227 |
| 2002/0010782 A1* | 1/2002 | Hoebeke | ............. | H04L 12/2874 709/227 |
| 2003/0145102 A1* | 7/2003 | Keller-Tuberg | ...... | H04L 12/185 709/236 |
| 2005/0027801 A1* | 2/2005 | Kashyap | ............... | H04L 12/185 709/204 |
| 2005/0070277 A1 | 3/2005 | Hu | | |
| 2005/0180447 A1* | 8/2005 | Lim | ...................... | H04W 40/32 370/408 |
| 2005/0198097 A1* | 9/2005 | Kalnitsky | ............. | H04L 65/611 709/200 |
| 2005/0198261 A1* | 9/2005 | Durvasula | ............. | H04L 47/803 709/224 |
| 2006/0018319 A1 | 1/2006 | Palin | | |
| 2006/0029078 A1* | 2/2006 | Lu | ......................... | H04L 12/185 370/395.2 |
| 2007/0280235 A1* | 12/2007 | Chen | .................... | H04W 12/069 370/312 |
| 2010/0316050 A1* | 12/2010 | Baykal | ................ | H04L 12/2881 370/400 |
| 2011/0019648 A1* | 1/2011 | Huang | .................. | H04W 72/30 370/332 |

(Continued)

FOREIGN PATENT DOCUMENTS

KR 20190001315 A 1/2019

*Primary Examiner* — Mark G. Pannell
(74) *Attorney, Agent, or Firm* — Michelle F. Murray; Frank D. Cimino

(57) ABSTRACT

A method includes broadcasting, by a multicast anchor, a first message that advertises a multicast service for a multicast group, and receiving, by the multicast anchor from a BLE device, a unicast message that indicates a request to join a BLE device to the multicast group. The method further includes joining, by the multicast anchor, the BLE device to the multicast group as a multicast client, and transmitting, by the multicast anchor to the BLE device, one or more multicast messages for the multicast group.

20 Claims, 19 Drawing Sheets

(56) References Cited

U.S. PATENT DOCUMENTS

| | | |
|---|---|---|
| 2011/0153818 A1* | 6/2011 | Vandwalle .............. H04L 69/28 |
| | | 709/224 |
| 2011/0158145 A1* | 6/2011 | Gong ................... H04L 12/189 |
| | | 370/312 |
| 2012/0057517 A1* | 3/2012 | Kambhatla ........... G06F 3/1454 |
| | | 370/315 |
| 2012/0213130 A1* | 8/2012 | Zhang ................... H04L 5/0098 |
| | | 370/312 |
| 2012/0257561 A1 | 10/2012 | Redding |
| 2015/0312381 A1* | 10/2015 | Savolainen ......... H04L 41/0293 |
| | | 709/204 |
| 2015/0334488 A1 | 11/2015 | Kim |
| 2016/0198317 A1* | 7/2016 | Li ........................... H04W 4/08 |
| | | 370/312 |
| 2017/0134294 A1* | 5/2017 | Li ........................ H04L 12/184 |
| 2019/0246254 A1* | 8/2019 | Chatterjee ............. H04W 76/11 |
| 2020/0008018 A1* | 1/2020 | Moustafa ............... H04W 4/80 |
| 2021/0075631 A1* | 3/2021 | Liao .................. H04M 15/8038 |
| 2022/0201784 A1* | 6/2022 | Bartier .................. H04L 45/122 |
| 2022/0369000 A1* | 11/2022 | Bouazizi ................ H04S 7/302 |
| 2023/0081145 A1* | 3/2023 | Godin .................. H04L 12/185 |
| | | 370/312 |
| 2023/0262578 A1* | 8/2023 | De ...................... H04W 40/246 |
| | | 370/329 |
| 2023/0345310 A1* | 10/2023 | Li ........................... H04W 4/06 |

* cited by examiner

BLE MULTICAST SERVICE

BACKGROUND

BLUETOOTH low energy (BLE) is a wireless communication technology useful for various applications and devices, such as in healthcare, fitness, security, entertainment, home automation, and communication devices. The BLE communication technology reduces the power consumption of communication devices by reducing device connection time in comparison to BLUETOOTH or other wireless communication technologies. The BLE communication technology also maintains a similar wireless communication range and coverage in comparison to BLUETOOTH or other wireless communication technologies. A BLE communication standard is supported by various operating systems (OS), including ANDROID, IOS, WINDOWS, MACOS, LINUX, and other OS to operate the devices.

SUMMARY

In accordance with at least one example of the disclosure, a method includes broadcasting, by a multicast anchor, a first message that advertises a multicast service for a multicast group, and receiving, by the multicast anchor, a unicast message that indicates a request to join a BLE device to the multicast group. The method further includes joining, by the multicast anchor, the BLE device to the multicast group as a multicast client, and transmitting, by the multicast anchor, one or more multicast messages for the multicast group.

In accordance with at least one example of the disclosure, a method includes receiving, by a BLE device, a broadcast message that advertises a multicast service, and in response to the broadcast message, transmitting, from the BLE device to a multicast anchor, a unicast message that requests joining a multicast group, and receiving one or more multicast messages for the multicast group.

In accordance with at least one example of the disclosure, a device includes a memory configured to store instructions, and a processor coupled to the memory. The instructions cause the processor to be configured to broadcast, a first message that requests to subscribe to a multicast service over a BLE network, receive a unicast message that indicates multicast connection parameters for receiving multicast messages of the multicast service, and receive the multicast messages according to the multicast connection parameters.

In accordance with at least one example of the disclosure, a device includes a memory configured to store instructions, and a processor coupled to the memory. The instructions cause the processor to be configured to receive a broadcast message that requests to subscribe a BLE device to a multicast service, and in response to the broadcast message, transmit a unicast message that indicates multicast connection parameters for receiving multicast messages of the multicast service, and transmit the multicast messages according to the multicast connection parameters.

DETAILED DESCRIPTION

According to the BLE communication standard, such as specified in the Bluetooth Core Specification Version 5.3, which is incorporated herein by reference, or its successors, communication devices (also referred to as BLE devices) are configured consistent with or in conformance to the BLE communication standard to establish links usable for data transfers. The links are wireless connections between BLE devices to transmit and exchange data in the form of messages or packets. The BLE devices can establish the links via radio frequency (RF) connections in a network. A network including BLE devices in communications over one or more links is also referred to herein as a BLE network. The BLE devices include central devices and peripheral devices. Peripheral devices may have limited power available in comparison to central devices. In general, peripheral devices can have lower power requirements to operate than central devices. Central devices may also have a power supply other than a battery, such as a gateway, a router, or a computer device connected to a power outlet (e.g., wall power). For example, a central device may be a smartphone, a tablet, or a laptop. A central device can have limited available power when operating on battery power, such as when unplugged from a power supply. In comparison, a peripheral device may be a device that has a smaller battery or a battery with a more limited power storage than the central device. For example, a peripheral device can be a sensor device or a wearable device, such as a temperature sensor or a wireless earphone.

Figure 1:
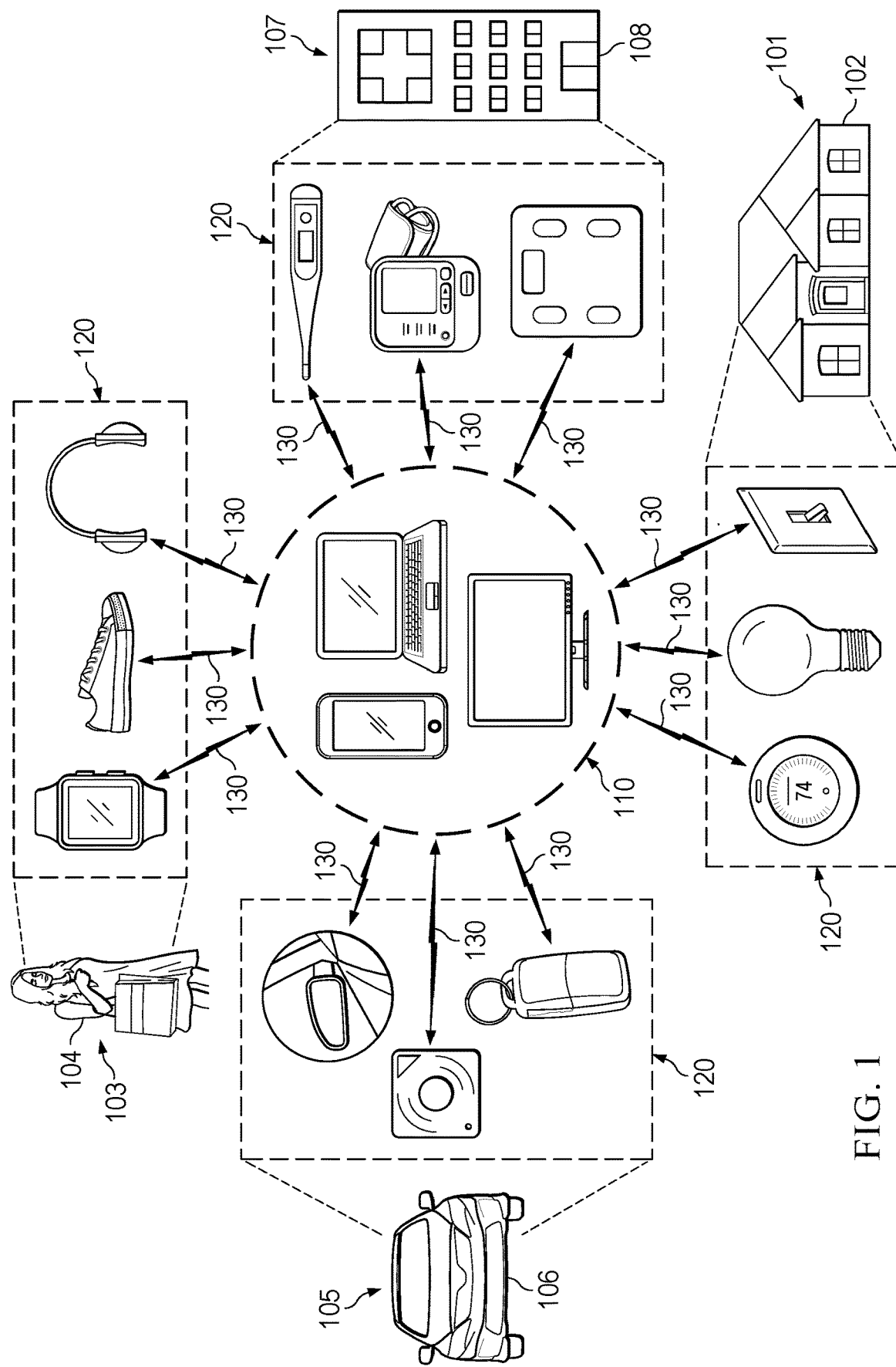
FIG. 1 is a block diagram of BLE networks, in accordance with various examples.

FIG. 1 is a block diagram of BLE networks, in accordance with various examples. The BLE networks include BLE devices that exchange BLE communications, such as for a multicast service. As illustrated, the BLE networks include a BLE network 101 of BLE devices at a household 102, a BLE network 103 of wearable BLE devices by a user 104, a BLE network 105 of BLE devices in a vehicle 106, and a BLE network 107 of health monitor devices at a healthcare facility 108 or a household. The BLE networks can be other networks connecting BLE devices, which are not shown. The BLE devices include central devices 110 and peripheral devices 120. In examples, the BLE devices are devices that support BLE communications, for instance consistent with or conforming to the BLE communication standard. Moreover, BLE devices can connect to the Internet, such as by a Wi-Fi connection, also referred to as Internet of Things (IoT) devices.

Examples of central devices 110 include smartphones, laptops, tablets, desktop computers, and other devices that can communicate based on the BLE communication standard and can have a power supply other than a battery. Examples of peripheral devices 120 include sensor devices, wearable devices, vehicle devices, health monitor devices, and other devices that can communicate based on the BLE communication standard. The peripheral devices 120 can include devices that have a battery or limited power available in comparison to central devices 110. In other examples, the peripheral devices 120 in a household 102 can include smart light switches, smart light bulbs, smart thermostats, and/or health monitor devices. The peripheral devices in a healthcare facility 108 can include health monitor devices, such as smart scales, thermometers, sensors, or other BLE capable devices or equipment. The peripherals devices 120 can also be wearable devices of a user 104, such as smart watches, earphones or earbuds, smart glasses, augmented reality (AR) or virtual reality (VR) goggles, fitness equipment or devices, or other wearable devices. In other examples, the peripheral devices 120 can be part of a vehicle 106, such as equipment sensors, radars, speakers, displays, smart keys, key fobs, or BLE tags.

Examples of a vehicle 106 include passenger cars, sport utility vehicles, vans, trucks, buses, all automobiles and, without limitation, any other type of vehicles. Vehicles can also include planes, boats, or any other vehicles for transporting a person.

The central devices 110 and peripheral devices 120 can exchange data in messages, such as in the form of data packets, over respective BLE links 130. A BLE link 130 is a wireless (e.g., RF) connection between a central device 110 and a peripheral device 120 that represents the transmission of messages or packets based on the BLE communication standard.

A group of BLE devices can communicate in a multi-peripheral mode in which multiple peripheral devices are connected to a single central device via respective links. In the multi-peripheral mode, there may be a single BLE link between each peripheral device and the central device. A group of BLE devices may also communicate in a multi-central mode in which multiple central devices are connected to a single peripheral device via respective links. In the multi-central mode, there may be a single BLE link between each central device and the peripheral device.

BLE communications on the BLE links between the central devices and peripheral devices can include broadcast and unicast messages or packets. A central device or a peripheral device can broadcast a message, also referred to as a broadcast message, within a certain RF range of connection. The broadcast message is useful to advertise information to the BLE devices in a BLE network. For example, the central device can advertise services in broadcast messages to the peripheral devices. The central device can send the broadcast message without encryption or can encrypt the broadcast message with a public key available to the peripheral devices in the BLE network. Accordingly, any peripheral device in the BLE network or within the RF range can detect and receive a service advertisement in a broadcast message.

In examples, a BLE device can operate as a server that broadcasts data on a regular basis to other BLE devices, also referred to as a broadcaster or an advertiser. The broadcaster or advertiser may not receive incoming data for the other devices. For example, based on the BLE communication standard, a BLE device can operate as a beacon in a broadcast mode. In this mode, the beacon can be set to a non-connectable state, which is not configured to receive data, and can broadcast a packet to any surrounding BLE devices at regular intervals. A BLE device can receive the beacon broadcast data at regular time intervals, when scanning for a broadcast data packet. For example, the packet can include up to 31 bytes of data. The packet can include a media access control (MAC) address, a received signal strength indicator (RSSI), and application-related advertising data. A BLE device that scans and receives the data from the broadcaster is also referred to as an observer. The observer may not send data (e.g., packets) to the broadcaster. For example, a gateway can be set in an observer mode to scan for a surrounding broadcaster or broadcast data.

A first BLE device can also transmit data designated to a certain second BLE device directly in a message, also referred to as a unicast message. Prior to transmitting the unicast message, the first BLE device can share a security key (e.g., a private key) with the second BLE device for decoding the unicast message. Accordingly, if the unicast message is detected or received by a third BLE device without the security key, the third BLE device cannot decode the unicast message. The unicast message can also include an identifier for the data.

According to the BLE communication standard, to transmit (as opposed to broadcast) the same information between a first BLE device and a group of second BLE devices, the first BLE device transmits a unicast message with the same information to each second BLE device in the group. The group of second BLE devices may not include all the BLE devices in the BLE network or within the RF range of connection. Transmitting the same information to a group of BLE devices is also referred to herein as multicasting. For example, to multicast the same information to a group of peripheral devices, a central device transmits a unicast message with the same information to each respective peripheral device in the group. The central device may also encode each unicast message to enable only the respective peripheral device to receive and decode the respective unicast message. Multicasting the same information in multiple unicast messages to multiple peripheral devices can increase the processing overhead of the information at the central device. For example, the central device may process each unicast message with a different private key and identifiers according to the respective peripheral device. According to the BLE communication standard, the central device also schedules the transmission of the unicast messages within non-overlapping time periods. Transmitting the unicast messages over multiple time periods increases transmission time to the peripheral devices in comparison to transmitting a single unicast message. Accordingly, scaling the multicasting of the information can be limited by the number of peripheral devices in the group.

The description provides examples to expand the BLE broadcasting for supporting BLE multicasting capability and reduce the processing overhead and the transmission time for multicasting. The processing overhead and the transmission time can be reduced by multicasting information in the same message, also referred to herein as a multicast message, simultaneously to a group of BLE devices in a BLE network. Processing a single multicast message for the group of BLE devices reduces the processing overhead in comparison to processing multiple unicast messages. Transmitting the single multicast message simultaneously to the group of BLE devices also reduces transmission time in comparison to transmitting multiple unicast messages over multiple time periods. Accordingly, multicasting data is scalable and independent of the number of BLE devices. Reducing the processing overhead and the transmission time can also reduce power consumption in BLE devices.

The data in the multicast message can be part of a service to the BLE devices, also referred to herein as a multicast service. Examples of multicast services include data streaming or download services such as for music, radio, video, television, weather, news, emergency alerts, or other content. For example, the data streaming or download services can be paid subscription based services or free subscription based services. Multicast services can also include data for controlling, managing, or operating BLE devices, such as time data, sensor data, application or software downloads and upgrades, or other data. In examples, the data can be vehicle information such as speed data or other vehicle settings or measurement data. The information or data of the multicast service is also referred to herein as multicast data.

In examples, data for multicast services can be multicast on multiple channels, also referred to herein as multicast channels. A BLE device can subscribe to obtain multicast services on a multicast channel or a set of multicast channels. The multicast data includes an identifier that indicates the respective multicast service. The identifier also associates one or more multicast channels, which provide the multicast data, with the respective multicast service.

A BLE device is configured to transmit the multicast data in the same multicast message simultaneously to a designated group of BLE devices, also referred to herein as a multicast group. The BLE device that transmits the multicast data is referred to herein as a multicast anchor. The BLE devices that receive the multicast data from the multicast anchor are referred to herein as multicast clients. The multicast group is a group of multicast clients that subscribe to a multicast service by joining the multicast group to receive related multicast data.

The multicast anchor is configured to provide a multicast service to one or more multicast groups of multicast clients that subscribe to the same multicast service. The multicast anchor is also configured to define the starting point, such as by setting a starting time, of multicast connection events to transmit the multicast data of the multicast service. The multicast anchor can determine the frequency and power of the multicast connection events for a certain multicast service and provide the multicast data of the multicast service in the multicast connection events to multicast clients of one or more respective multicast groups. The multicast anchor can also determine the multicast channel for the multicast service. For example, the multicast clients of a multicast group can receive the multicast data on a certain multicast channel according to the device capabilities of the multicast clients. In examples, the multicast anchor can be a central device and the multicast clients can be peripheral devices. In other examples, the multicast anchor can be a peripheral device and the multicast clients can include a central device. In examples, a central device acting as a multicast anchor for a first multicast group can be a multicast client in a second multicast group. A peripheral device acting as a multicast client in a first multicast group can also be a multicast anchor for a second multicast group.

The multicast anchor is configured to advertise the multicast service to any surrounding BLE devices, or in the BLE network, by broadcasting an advertisement message for one or more multicast services. The advertisement message can be a multicast capability advertisement message that indicates a supported set of multicast services. For example, the supported set of multicast services can include one or more multicast services that are provided on one or more multicast channels. The multicast capability advertisement message is a broadcast message that can include unencrypted data or data encoded by a public key. A BLE device within the RF range can detect and receive the multicast capability advertisement message from the multicast anchor. The BLE device can then transmit a unicast message to request to join a multicast group of multicast clients. Responsive to the request to join the multicast group, the multicast anchor transmits to the BLE device a unicast message that indicates multicast connection parameters for receiving the multicast data. The multicast connection parameters configure the BLE device to begin receiving multicast messages from the multicast anchor as a multicast client in the multicast group. For example, the multicast connection parameters indicate the time and frequency to detect a next multicast message from the multicast anchor, also referred to herein as listening for the multicast message.

In other examples, a BLE device that is a multicast end-point for receiving multicast data can broadcast an advertisement message which includes a request to subscribe to one or more multicast services, also referred to herein as a multicast subscription request advertisement message. The multicast end-point BLE device can broadcast to any surrounding BLE devices, or in a BLE network, a subscription request advertisement message which indicates a supported set of multicast services. The supported set of multicast services can be received by the BLE on one or more multicast channels. The multicast subscription request advertisement message can include unencrypted data or data encoded by a public key. A BLE device within the RF range can then detect and receive the multicast subscription request advertisement message from the multicast end-point BLE device. A multicast anchor that receives the multicast subscription request advertisement message can then transmit to the multicast end-point BLE device a unicast confirmation message as a confirmation to join a multicast group of multicast clients, also referred to herein as a join confirmation message.

Figure 2A:
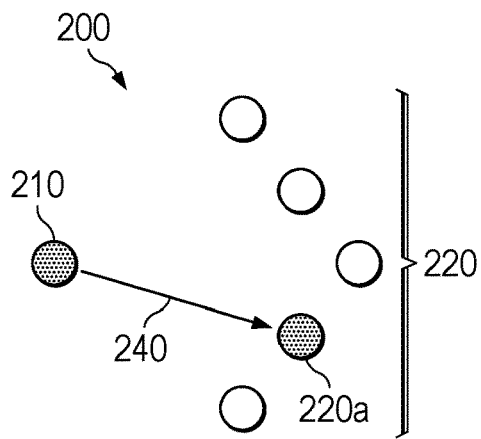
FIG. 2A is a block diagram of a unicast message exchange between two BLE devices, in accordance with various examples.
Figure 2B:
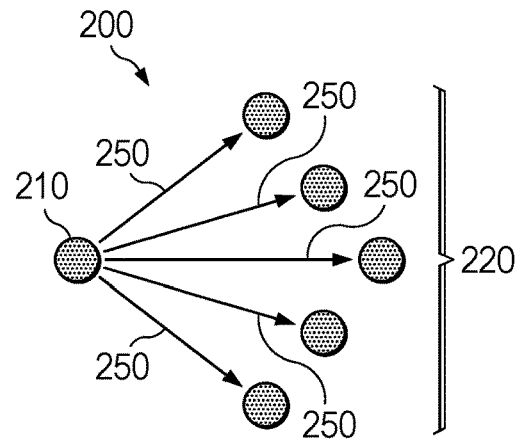
FIG. 2B is a block diagram of a broadcast message exchange in a BLE network, in accordance with various examples.
Figure 2C:
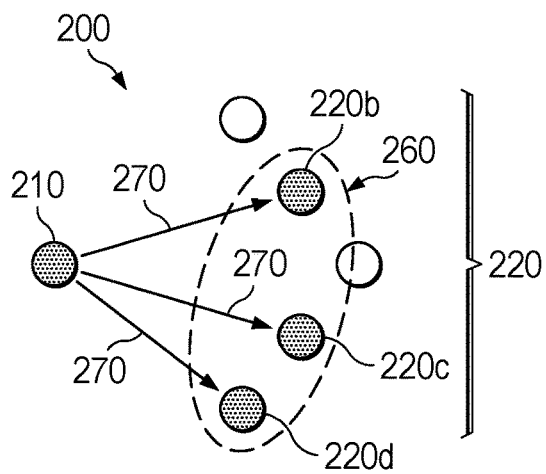
FIG. 2C is a block diagram of a multicast message exchange between a BLE device and a group of BLE devices, in accordance with various examples.

FIGS. 2A-2C show examples of message exchanges in a BLE network 200 between BLE devices 210 and 220. FIG. 2A is a block diagram of a unicast message exchange between two BLE devices, in accordance with various examples. A first BLE device 210 (e.g., a central device) transmits a unicast message 240 to a second BLE device 220a (e.g., a peripheral device). The first BLE device 210 can encode the unicast message 240 with a security key (e.g., a private key) shared only with the second BLE device 220a. Accordingly, if a BLE device 220 other than the second BLE device 220a detects or receives the unicast message 240, the BLE device 220 is unable to decode the unicast message 240 to obtain data. The unicast message 240 can also include an identifier of a service associated with the data in the unicast message 240. In examples, the unicast message 240 is a packet that includes a packet data unit (PDU) and other fields. The PDU can include a header field and a payload field. The payload field includes the information or data communicated by the first BLE device 210 to the second BLE device 220a. The header can include an identifier that indicates the service associated with the PDU. The header can also include a PDU type field that indicates the type of the unicast message 240 (e.g., a request message, a response message, etc.). The header can also include a length field that indicates the length of the payload field (e.g., in bits or octets). Other fields in the PDU can include a preamble field that is useful for time synchronization of the packet at the second BLE device 220a, an access address field for matching unicast messages between the communicating BLE devices, and/or a cyclic redundancy check (CRC) field for error detection. A PDU packet transmitted by a BLE device is also referred to herein as a BLE packet.

FIG. 2B is a block diagram of a broadcast message exchange in the BLE network 200, in accordance with various examples. The first BLE device 210 sends the broadcast message 250 in the BLE network 200. The broadcast message 250 can be an advertisement message that advertises a service to the BLE devices 220. The service can be data for an application that runs on the BLE devices 220, such as music, video, or other applications, or data for operating the BLE devices 220. Accordingly, the BLE devices 220 in the RF range of connection can detect and receive the broadcast message 250 to obtain the advertisement information. In examples, the broadcast message 250 is a packet that includes a PDU and other fields. The PDU can include a header field and a payload field that carries the advertisement information. The header field can include a PDU type field that indicates that the broadcast message 250 is an advertisement message.

FIG. 2C is a block diagram of a multicast message exchange between the first BLE device 210 and a group of BLE devices 220, in accordance with various examples. The group of BLE devices 220 is a multicast group 260 of multicast clients 220b, 220c, 220d that receive multicast data. The multicast group 260 of the multicast clients 220b, 220c, 220d can be a subset of the BLE devices 220. The first BLE device 210 transmits a multicast message 270 in the BLE network 200 that includes multicast data for the multicast group 260. In examples, the multicast message 270 is a packet that includes a PDU and other fields. The PDU can include a header field and a payload field that carries the multicast data. The header can include a PDU type field that indicates the type of the multicast message 270. Examples of PDU types include an advertisement to request a connection to any device, a direct advertisement to request a connection to a certain device, an advertisement to non-connectable devices to advertise information to any listening device, and an advertisement to non-connectable devices with the option of additional information based on response scanning. PDU types can also include, an advertisement on a primary channel, an advertisement on a secondary channel, and periodic advertisement.

The multicast clients 220b, 220c, 220d in the multicast group 260 can receive the multicast message 270 and obtain the multicast data based on multicast connection parameters from the first BLE device 210. For example, the first BLE device 210 can send the multicast connection parameters prior to the multicast message 270 in a respective unicast message to each of the multicast clients 220b, 220c, 220d. The multicast connection parameters can include a security key for the multicast group 260 to decode the multicast message 270, also referred to herein as a connection multicast group key. The multicast connection parameters can also include a multicast connection interval, a connection anchor point, and/or a connection channel set. The connection channel set can indicate the time, frequency, and/or channel for receiving the multicast message 270, respectively. For example, the multicast connection parameters indicates a time for receiving or to start the multicast messages. The first BLE device 210 can send the multicast connection parameters during a multicast service discovery exchange with each of the multicast clients 220b, 220c, 220d. The first BLE device 210 can then send the multicast data in one or more multicast messages 270 during a multicast service operation exchange with the multicast group 260.

Figure 3:
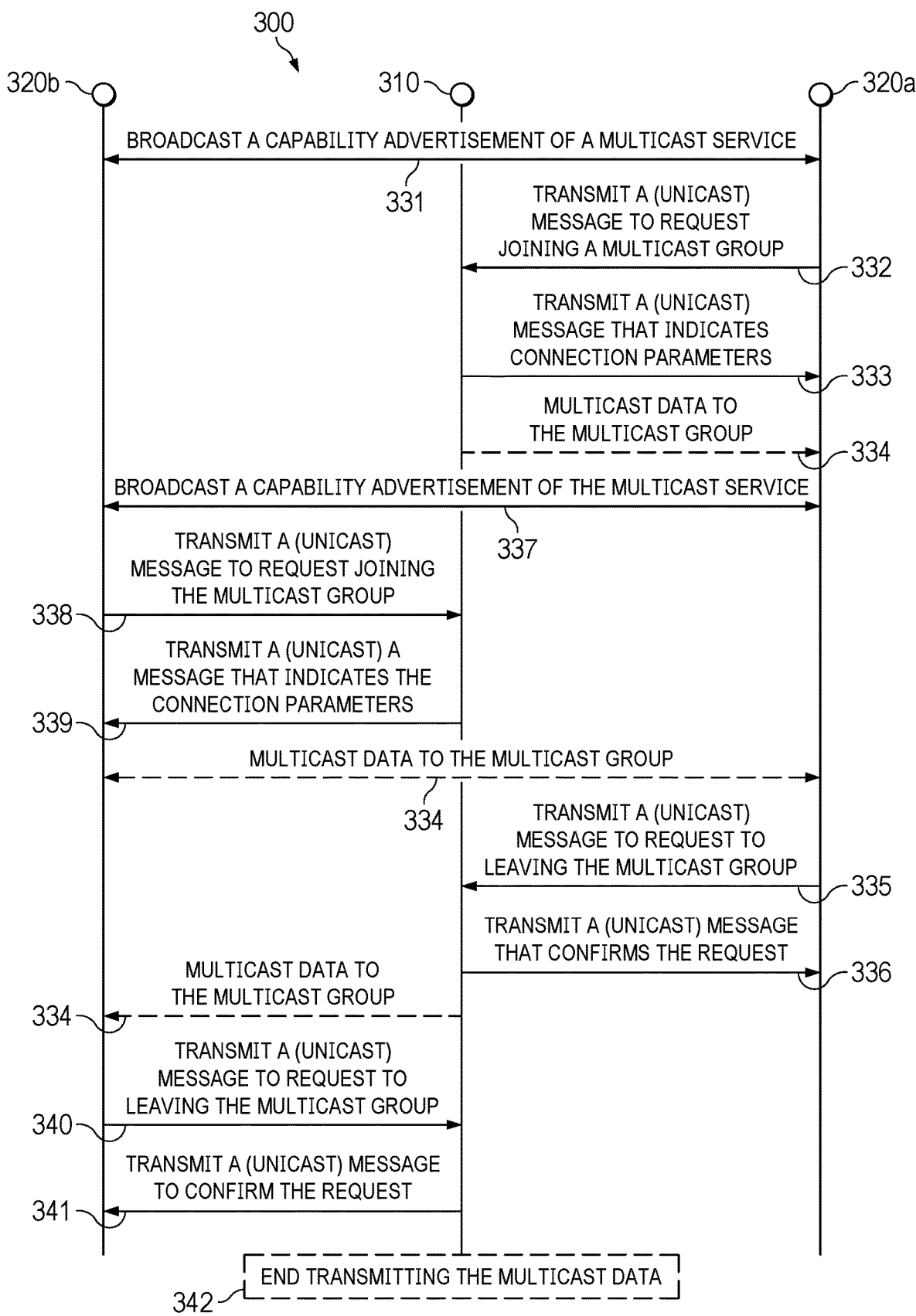
FIG. 3 is a message sequence diagram illustrating an exchange of messages between BLE devices for discovery and operation of a multicast service, in accordance with various examples.

FIG. 3 is a message sequence diagram 300 illustrating an exchange of messages between BLE devices for discovery and operation of a multicast service, in accordance with various examples. The multicast discovery exchange in the message sequence diagram 300 is based on broadcasting a multicast capability advertisement message by a multicast anchor 310. For example, the multicast anchor 310 broadcasts a capability advertisement of the multicast service during a multicast service discovery exchange. The multicast anchor 310 can be a central device or a peripheral device that provides a multicast service to other BLE devices in a BLE network. The capability advertisement can be broadcast by sending a broadcast message 331 in a BLE network or to BLE devices within an RF range of connection. The capability advertisement broadcast message 331 can include an identifier of the multicast service. The broadcast message 331 can also include multicast group capabilities associated with the multicast group and the multicast clients of the multicast group. The broadcast message 331 can also include an identifier of the advertised multicast group for the multicast service, such as if the multicast service is associated with multiple multicast groups, such as with different multicast group capabilities.

In examples, the broadcast message 331 is a packet that includes a PDU type field that indicates an advertisement for a multicast service. The multicast anchor 310 can repeatedly send the broadcast message 331 in regular time intervals to allow multiple BLE devices to detect and receive the broadcast message 331. The BLE devices can be configured to scan for broadcast messages 331 from other BLE devices, such as by listening for a packet at regular time intervals. The regular time intervals, also referred to herein as time periods, can be separated by equal time delays. For example, the multicast anchor 310 sends the broadcast message 331 every 300 microseconds, such as during switching the broadcasting from a primary channel to a secondary channel. In other examples, the multicast anchor 310 can send the broadcast message 331 in shorter time periods, such as within 150 microseconds. BLE devices 320a and 320b can be configured to detect and receive the advertisement in the broadcast message 331 within matching time periods.

As shown, the BLE device 320a can detect and receive the capability advertisement in the broadcast message 331. For example, the BLE devices in the BLE network including the BLE device 320a can be configured to listen for the capability advertisement within the time periods of the broadcast message 331. Responsive to receiving the broadcast message 331, the BLE device 320a transmits a unicast message 332 to the multicast anchor 310 to request joining a multicast group. The unicast message 332 can include a PDU type field that indicates a join request to a multicast group. The multicast group is a group of multicast clients configured to receive multicast data associated with the multicast group. The unicast message 332 can also include an access address field that matches the access address field in the broadcast message 331.

In response to receiving the request in the unicast message 332, the multicast anchor 310 joins or adds the BLE device 320a to the multicast group and transmits a unicast message 333 that indicates multicast connection parameters to the BLE device 320a. The unicast message 333 is or includes a join response to indicate adding the BLE device 320a as a multicast client to the multicast group. In examples, the multicast anchor 310 determines to add the BLE device 320a to the multicast group based on certain permission rules, such as the type, capabilities, or security restrictions of the BLE device 320a. In examples, the multicast anchor 310 joining or adding BLE devices to a multicast group includes performing one or more actions or functions to associate a BLE device, such as the BLE device 320a, to the multicast group. Such actions may include sending the BLE device data packets with information that defines the multicast group, such as an Internet Protocol (IP) address and/or a port number. The information can also include a connection multicast group key for decoding the multicast data of the multicast group.

The multicast anchor 310 can determine the multicast connection parameters based on operation parameters of the multicast service and capability requirements of the multicast clients for the multicast service. For example, for the same multicast service, the multicast anchor 310 can determine different multicast connection parameters for respective multicasts groups of multicast clients with respective group capabilities. The multicast connection parameters configure the BLE device 320a to receive multicast data as a multicast client in a multicast group.

The unicast message 333 can include an identifier of the multicast service. The unicast message 333 can also include an identifier of the multicast group, such as if the multicast service is associated with multiple multicast groups. In examples, the unicast message 333 is a packet that includes a PDU type field that indicates a join response to add the BLE device 320a as a multicast client to the multicast group. The unicast message 333 can also include an access address field that matches the access address field in the unicast message 332.

The multicast anchor 310 transmits multicast data to the multicast group. The multicast anchor 310 transmits the multicast data in one or more multicast messages 334 to the multicast group including one or more multicast clients. Each multicast client in the multicast group can receive the multicast message(s) 334 and decode the multicast data based on a connection multicast group key in the multicast connection parameters. In examples, the multicast anchor 310 begins to transmit the multicast data in the one or more multicast messages 334 if the multicast group includes at least one multicast client.

To leave the multicast group, the BLE device 320a transmits a unicast message 335 to request leaving the multicast group. For example, the BLE device 320a can request to leave the multicast group to stop receiving the multicast data. The unicast message 335 can include a PDU type field that includes a leave indication from the multicast group. In response to receiving the request, the multicast anchor 310 removes the BLE device from the multicast group and transmits a unicast message 336 that confirms the request from the BLE device 320a to leave the multicast group. The unicast message 336 can include a PDU type field that indicates a leave confirmation to the BLE device 320a. The unicast message 336 can also include an access address field that matches an access address field in the third unicast message. In examples, the multicast anchor 310 removing BLE devices from a multicast group includes performing one or more actions or functions to disassociate a BLE device, such as the BLE device 320a, from the multicast group. Such actions may include updating the information that defines the multicast group (e.g., IP address, port number, connection multicast group key, etc.) with the BLE clients that remain in the multicast group. The updated information prevents the leaving BLE devices from receiving and decoding the multicast data of the multicast group.

Also, the multicast anchor 310 can perform a procedure responsive to removing the BLE device 320a as a multicast client from the multicast group. The procedure can include changing at least the connection multicast group key or other multicast connection parameters and sharing the updated multicast connection parameters with the remaining multicast clients in the multicast group. The multicast anchor 310 can then transmit the updated connection parameters with the multicast data in a next multicast message to the multicast group. In other examples, the multicast anchor 310 removes the BLE device 320a as a multicast client from the multicast group without transmitting the unicast message 336 that confirms the request from the BLE device 320a to leave the multicast group.

As shown in FIG. 3, the BLE device 320b exchanges unicast messages 338 and 339 with the multicast anchor 310 to join, as a second multicast client, the multicast group and receive the multicast data. For example, the unicast messages 338 and 339 are exchanged in response to a broadcast message 337 the multicast anchor 310 sends, which includes or indicates a capability advertisement of the multicast service. In another example, the unicast messages 338 and 339 are exchanged in response to the broadcast message 331. Responsive to receiving the broadcast message 337, the BLE device 320b transmits the unicast message 338 to the multicast anchor 310 to request joining the multicast group. The unicast message 338 can include a PDU type field that indicates a join request to a multicast group. The unicast message 338 can also include an access address field that matches the access address field in the broadcast message 338. In response to receiving the request in the unicast message 338, the multicast anchor 310 joins the BLE device 320b to the group and transmits the unicast message 339 that indicates multicast connection parameters to the BLE device 320b. The unicast message 339 is or includes a join response to indicate adding the BLE device 320b as a multicast client to the multicast group. The BLE device 320b can then receive and decode the one or more multicast messages 334 sent after the BLE device 320b was joined to the group.

The BLE device 320b also exchanges unicast messages 340 and 341 with the multicast anchor 310 to leave the multicast group. Namely, the BLE device 320b transmits the unicast message 340 to request leaving the multicast group. The unicast message 340 can include a PDU type field that includes a leave indication from the multicast group. In response to receiving the request, the multicast anchor 310 removes the BLE device 320b from the multicast group and transmits the unicast message 341 that confirms the request from the BLE device 320b to leave the multicast group. The unicast message 341 can include a PDU type field that indicates a leave confirmation to the BLE device 320b. The unicast message 341 can also include an access address field that matches an access address field in the unicast message 340.

The multicast anchor 310 can check if the multicast group is empty of multicast clients at certain time intervals, such as each time after receiving a request from a multicast client to leave the multicast group. If the multicast anchor 310 determines that the multicast group is empty of multicast clients, the multicast anchor 310 can stop transmitting multicast messages at 342. The multicast anchor 310 can resume transmitting multicast messages after a BLE device joins the multicast group as a multicast client.

Figure 4:
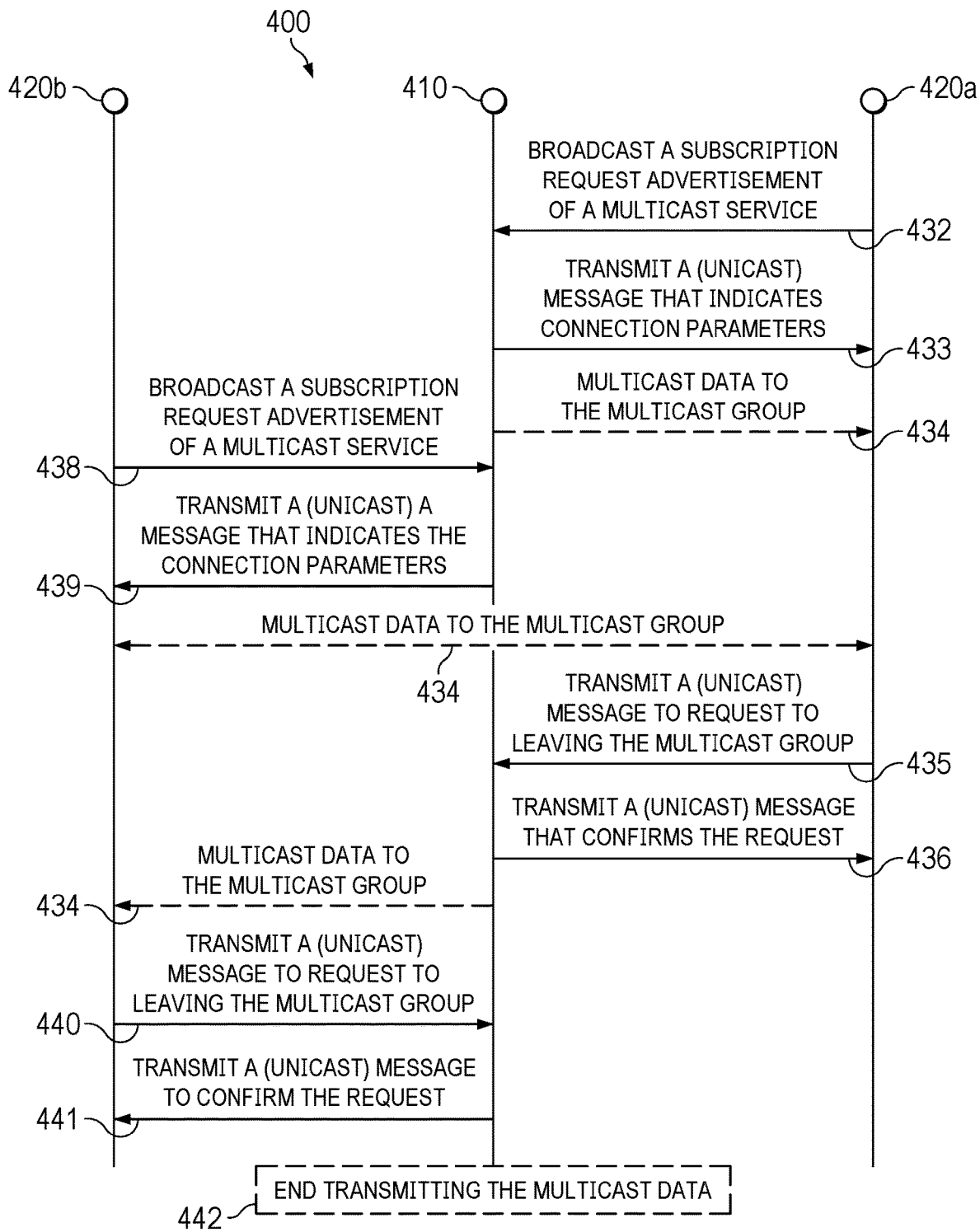
FIG. 4 is a message sequence diagram illustrating an exchange of messages between BLE devices for discovery and operation of a multicast service, in accordance with various examples.

FIG. 4 is a message sequence diagram 400 illustrating an exchange of messages between BLE devices for discovery and operation of a multicast service, in accordance with various examples. The multicast discovery exchange in the message sequence diagram 400 is based on broadcasting a multicast subscription request advertisement message by a BLE device. For example, a first BLE device 420a broadcasts a subscription request advertisement of a multicast service during a multicast service discovery exchange. The first BLE device 420a can be a central device or a peripheral in a BLE network. The subscription request advertisement can be broadcast by sending a broadcast message 432 in a BLE network or to BLE devices within an RF range of connection. The broadcast message 432 can include an identifier of the multicast service that is requested by the BLE device. For example, the identifier of the multicast service is previously sent to or is stored on the BLE device. The broadcast message 432 can also indicate a set of multicast services that are supported by the first BLE 420a and/or device capabilities of the first BLE device 420a.

In examples, the broadcast message 432 is a packet that includes a PDU type field that indicates an advertisement for a multicast service. The first BLE device 420a can repeatedly send the broadcast message 432 in regular time intervals to allow multiple BLE devices to detect and receive the broadcast message 432. The BLE devices can be configured to scan for broadcast messages from other BLE devices, such as by listening for a packet at regular time intervals. The regular time intervals, also referred to herein as time periods, can be separated by equal time delays. For example, the first BLE device 420a sends the broadcast message 432 every 300 microseconds. In other examples, the first BLE device 420a can send the broadcast message 432 in shorter time periods, such as within 150 microseconds. Other BLE devices can also be configured to detect and receive the subscription request advertisement in the broadcast message 432 within matching time periods.

In response to receiving the subscription request, a multicast anchor 410 transmits a unicast message 433 that indicates multicast connection parameters to the first BLE device 420a. The unicast message 433 is a join confirmation to accept adding the first BLE device 420a as a multicast client to the multicast group. The multicast anchor 410 can determine adding the first BLE device 420a to the multicast group based on certain permission rules, such as the type, capabilities, or security restrictions of the first BLE device 420a. The multicast anchor 410 can also determine the multicast connection parameters based on operation parameters of the multicast service and capability requirements of the multicast clients for the multicast service. The unicast message 433 can include an identifier of the multicast service. The unicast message 433 can also include an identifier of the multicast group, such as if the multicast service is associated with multiple multicast groups. In examples, the unicast message 433 is a packet that includes a PDU type field that indicates a join confirmation to add the first BLE device 420a as a multicast client to the multicast group.

After receiving the broadcast message 432 or sending the unicast message 433, the multicast anchor 410 can transmit multicast data to the multicast group. The multicast anchor 410 transmits the multicast data in one or more multicast messages 434 (e.g., packets) to the multicast group including one or more multicast clients. Each multicast client in the multicast group can receive the multicast message(s) 434 and decode the multicast data based on a connection multicast group key in the multicast connection parameters. In examples, the multicast anchor 410 begins to transmit the multicast data in one or more multicast messages 434 if the multicast group includes at least one multicast client.

To leave the multicast group, the first BLE device 420a transmits a unicast message 435 to request leaving the multicast group and stop receiving the multicast data. The unicast message 435 can include a PDU type field that includes a leave indication from the multicast group. In response to receiving the request, the multicast anchor 410 transmits, a unicast message 436 that confirms the request from the first BLE device 420a to leave the multicast group. The unicast message 436 can include a PDU type field that indicates a leave confirmation to the first BLE device 420a. The unicast message 436 can also include an access address field that matches an access address field in the unicast message 435. The multicast anchor 410 can also perform a procedure to remove the first BLE device 420a as a multicast client from the multicast group. For example, the multicast anchor 410 can change at least the connection multicast group key or other multicast connection parameters and share the updated multicast connection parameters with the remaining multicast clients in the multicast group. In other examples, the multicast anchor 410 removes the first BLE device 420a as a multicast client from the multicast group without transmitting the unicast message 436 to confirm the request from the first BLE device 420a to leave the multicast group.

As shown in FIG. 4, the BLE device 420b broadcasts a subscription request advertisement of the multicast service during a multicast service discovery exchange. The subscription request advertisement can be broadcast by sending a broadcast message 438 in the BLE network or to BLE devices within the RF range of connection. The broadcast message 438 can include an identifier of the multicast service. The broadcast message 438 can also indicate a set of multicast services that are supported by the BLE 420*b* and/or device capabilities of the first BLE device 420*b*.

In response to receiving the subscription request, the multicast anchor 410 transmits a unicast message 439 that indicates multicast connection parameters to the BLE device 420*b*. The unicast message 439 is also a join confirmation to accept adding the BLE device 420*b* as a multicast client to the multicast group. The unicast message 439 can include an identifier of the multicast service. The unicast message 439 can also include an identifier of the multicast group, such as if the multicast service is associated with multiple multicast groups. In examples, the unicast message 439 is a packet that includes a PDU type field that indicates a join confirmation to add the BLE device 420*b* as a multicast client to the multicast group. The BLE device 420*b* can then receive and decode the one or more multicast messages 434 sent after the BLE device 420*b* was joined to the group.

The BLE device 420*b* also exchanges unicast messages 440 and 441 with the multicast anchor 310 to leave the multicast group. Namely, the BLE device 420*b* transmits the unicast message 440 to request leaving the multicast group. The unicast message 440 can include a PDU type field that includes a leave indication from the multicast group. In response to receiving the request, the multicast anchor 310 removes the BLE device 420*b* from the multicast group and transmits the unicast message 441 that confirms the request from the BLE device 420*b* to leave the multicast group. The unicast message 441 can include a PDU type field that indicates a leave confirmation to the BLE device 420*b*. The unicast message 441 can also include an access address field that matches an access address field in the unicast message 440. The multicast anchor 410 can check if the multicast group is empty of multicast clients at certain time intervals, and accordingly stop transmitting multicast messages at 442.

Figure 5:
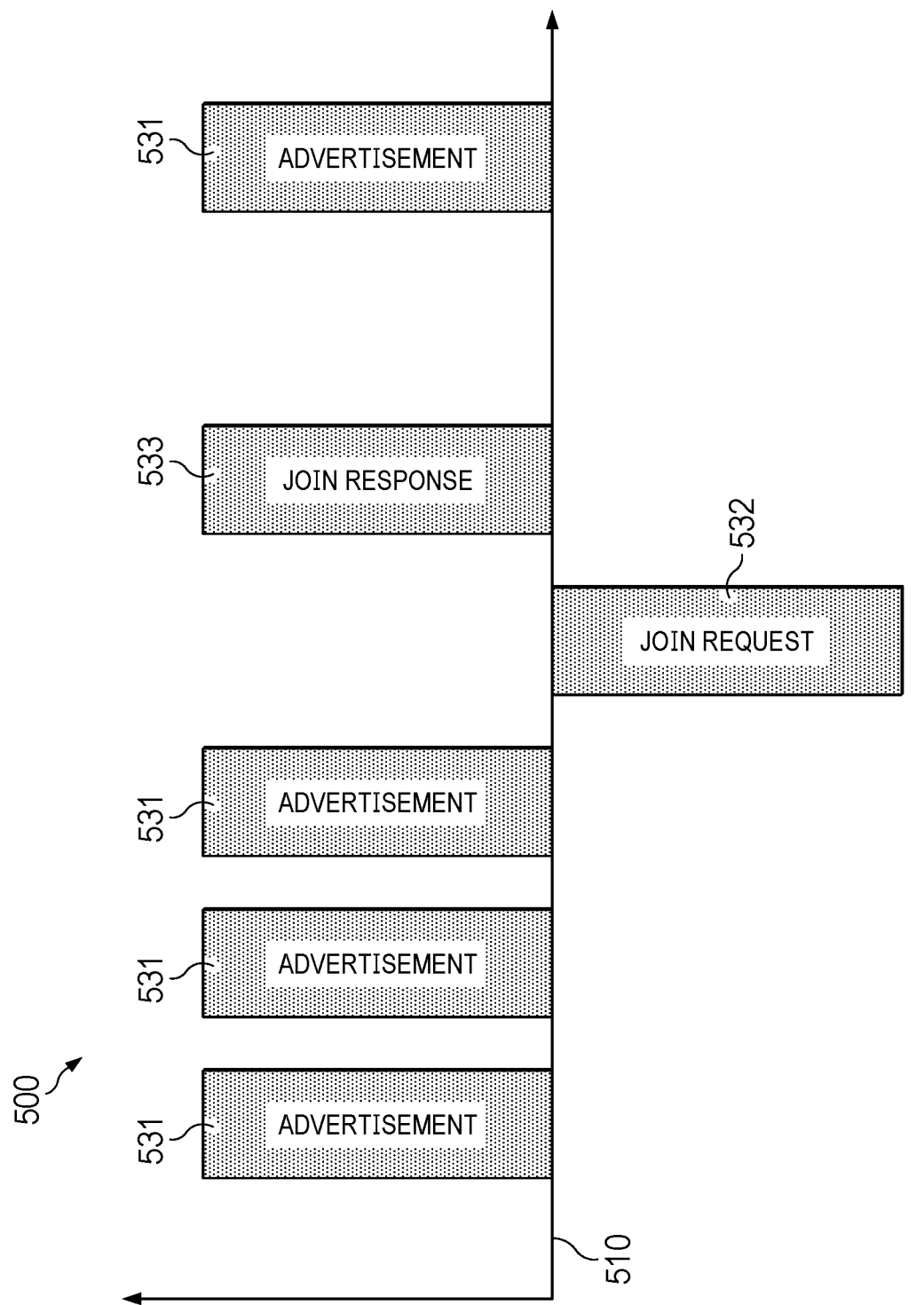
FIG. 5 is a message timing diagram of a message exchange for establishing a multicast service, in accordance with various examples.

FIG. 5 is a timing diagram of a message exchange 500 for establishing a multicast service for a multicast client, such as the BLE devices 320*a* and 320*b* in FIG. 3, in accordance with various examples. The message exchange 500 for establishing the multicast service is based on broadcasting a multicast capability advertisement message by a multicast anchor on a time axis 510, such as the multicast anchor 310 of FIG. 3. Messages above the time axis 510 indicate messages transmitted by the multicast anchor. Messages below the time axis 510 indicate messages from a multicast client or a BLE device seeking to join a multicast group as a multicast client.

As shown, the multicast anchor broadcasts multiple capability advertisement messages 531 over a sequence of time periods. The capability advertisement message 531 identifies the multicast service. The capability advertisement message 531 can also include an identifier of the advertised multicast group for the multicast service. If the multicast anchor receives a join request message 532 from a BLE device, the multicast anchor transmits a join response message 533 to the BLE device. The join request message 532 and the join response message 533 are unicast messages. The join request message 532 is a request to subscribe the BLE device to the multicast service. The join response message 533 indicates adding or joining the BLE device as a multicast client to a multicast group for receiving multicast data of the multicast service. The join response message 533 can include an identifier of the multicast group. The multicast anchor can establish the multicast service with at least one multicast client in the multicast group. The multicast anchor can also continue to broadcast capability advertisement messages 531 in subsequent time periods to continue advertising the multicast service to other BLE devices. After establishing the multicast service, the multicast anchor can transmit the multicast data in multicast messages to the multicast group on the same channel as the capability advertisement message 531.

Figure 6:
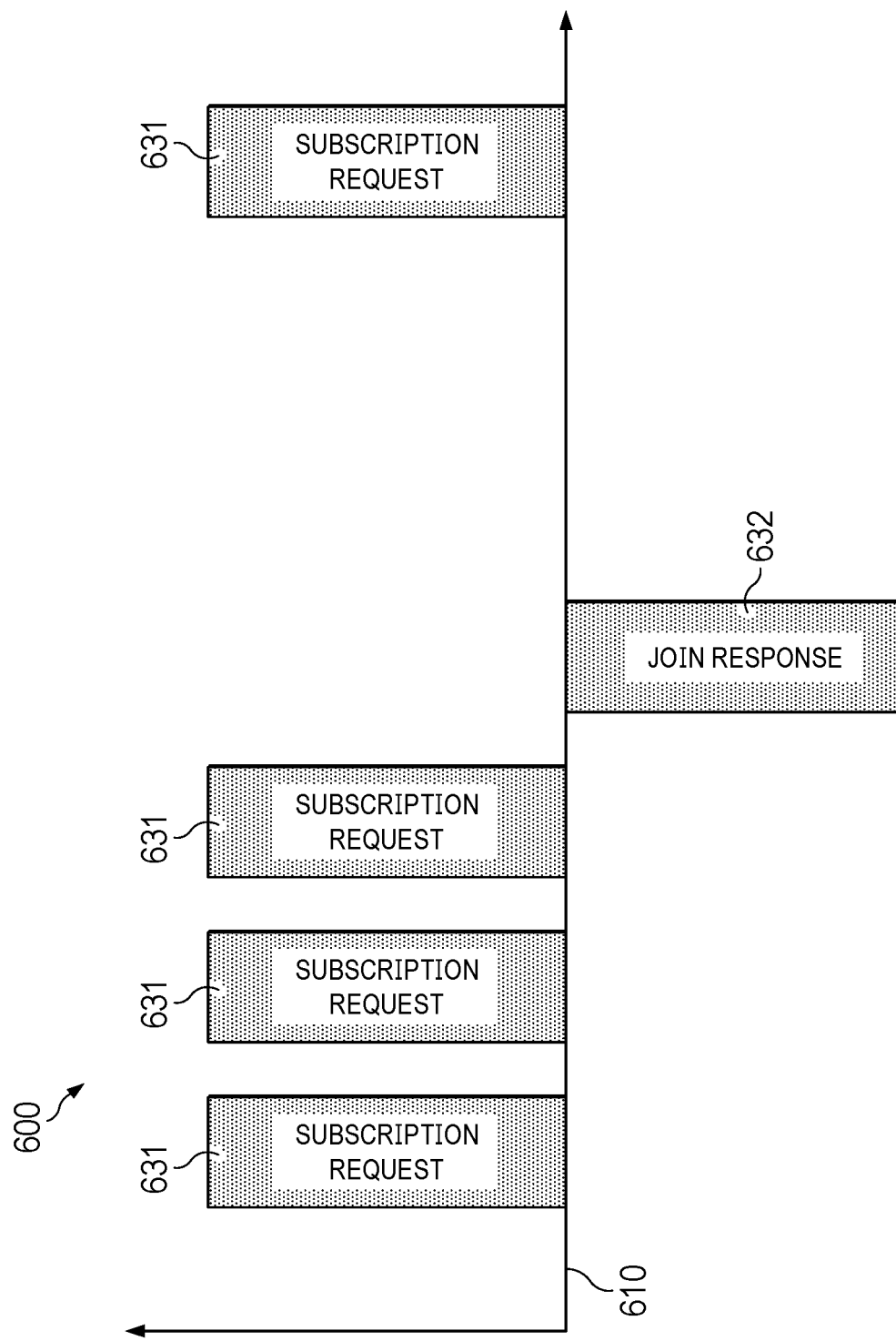
FIG. 6 is a message timing diagram of a message exchange for establishing a multicast service, in accordance with various examples.

FIG. 6 is a timing diagram of a message exchange 600 for establishing a multicast service for a multicast client, in accordance with various examples. The message exchange 600 for establishing the multicast service is based on broadcasting a multicast subscription request advertisement message by a BLE device on a time axis 610, such as the BLE device 320*a* of FIG. 3. Messages below the time axis 610 indicate messages transmitted by the BLE device seeking to join a multicast group as a multicast client. Messages above the time axis 610 indicate messages from a multicast anchor. The BLE device broadcasts multiple subscription request advertisement message 631 in a sequence of time periods. The subscription request advertisement message 631 indicates a supported multicast service or a set of supported multicast services by the BLE device. The subscription request advertisement message 631 can also include device capabilities of the BLE device.

If a multicast anchor receives the subscription request advertisement message 631 from the BLE device, the multicast anchor transmits a join response message 632 to the BLE device. The join response message 632 is a unicast message that indicates adding or joining the BLE device as a multicast client to a multicast group for receiving multicast data of the multicast service. The join response message 632 can also include an identifier of the multicast group. The multicast anchor can establish the multicast service with at least one multicast client in the multicast group. After establishing the multicast service, the multicast anchor can transmit the multicast data in multicast messages to the multicast group, such as on the same channel as the subscription request advertisement message 631. The BLE device can continue to broadcast subscription request advertisement messages 631 in subsequent time periods to continue advertising a supported multicast service.

Figure 7:
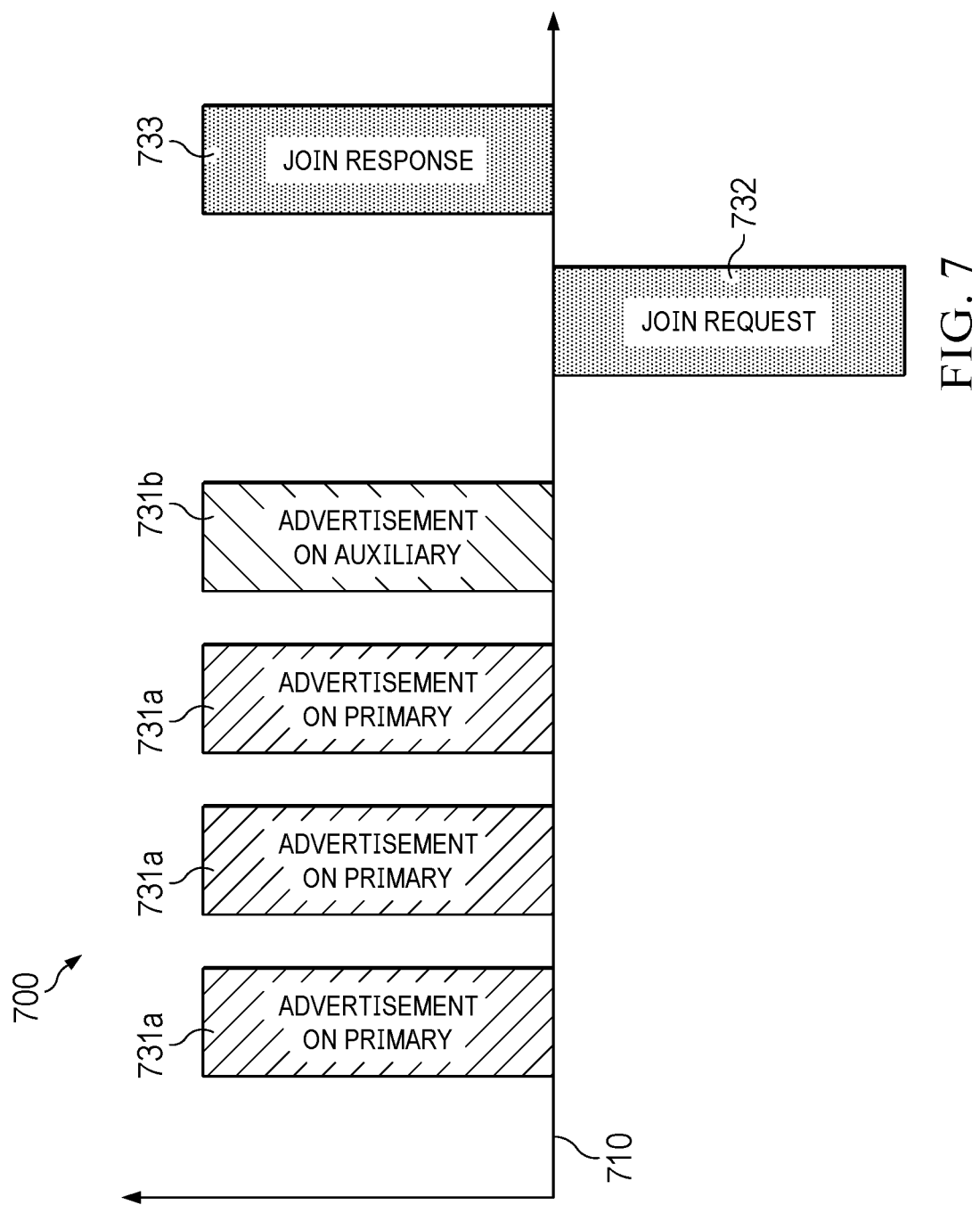
FIG. 7 is a message timing diagram of a message exchange for establishing a multicast service on an auxiliary channel, in accordance with various examples.

In other examples, a multicast anchor can broadcast one or more capability advertisement messages and transmit multicast messages on different channels. FIG. 7 is a timing diagram of a message exchange 700 for establishing a multicast service on an auxiliary channel, in accordance with various examples. The message exchange 700 for establishing the multicast service is based on broadcasting a multicast capability advertisement message by a multicast anchor on a time axis 710. Messages above the time axis 710 indicate messages transmitted by the multicast anchor. Messages below the time axis 710 indicate messages from a multicast client or a BLE device seeking to join a multicast group as a multicast client.

To establish the multicast service, a multicast anchor broadcasts capability advertisement messages 731*a* in a sequence of first time periods on a primary channel in a BLE network. The multicast anchor can also broadcast capability advertisement messages 731*b* in a sequence of second time periods on an auxiliary channel in the BLE network. The first time periods and the second time periods can have different time durations and can be separated by different respective time delays. The capability advertisement message 731*a* on the primary channel can include parameters to connect to the auxiliary channel. For example, the capability advertisement message 731*a* can include an identifier of the auxiliary channel of the capability advertisement message

731b. The capability advertisement message 731b can include the multicast connection parameters for receiving the multicast data or multicast messages on the auxiliary channel. For example, the capability advertisement message 731b can include timing information of multicast connection events on the auxiliary channel. The capability advertisement message 731b can also include an identifier of the advertised multicast group for the multicast service, and can indicate multicast group capabilities.

The BLE devices in the BLE network are configured to listen for the capability advertisement message 731a on the primary channel. Accordingly, if the BLE device receives the capability advertisement message 731a on the primary channel, the BLE device can switch to the auxiliary channel to receive the capability advertisement message 731b including the multicast connection parameters. In other examples, the BLE devices in the BLE network are configured to listen for the capability advertisement message 731a on the primary channel and the capability advertisement message 731b on the auxiliary channel.

If the multicast anchor receives a join request message 732 from a BLE device, the multicast anchor transmits a join response message 733 to the BLE device. The join request message 732 and the join response message 733 are unicast messages. The join response message 733 can include an identifier of the multicast group. The multicast anchor can receive the join request message 732 and transmit the join response message 733 on the auxiliary channel or the primary channel. The multicast anchor can then establish the multicast service with at least one multicast client in the multicast group. After establishing the multicast service, the multicast anchor can transmit the multicast data in multicast messages to the multicast group on the auxiliary channel. Transmitting the multicast messages on the auxiliary channel can increase the bandwidth in the BLE network to transmit more multicast data for the multicast service.

Figure 8:
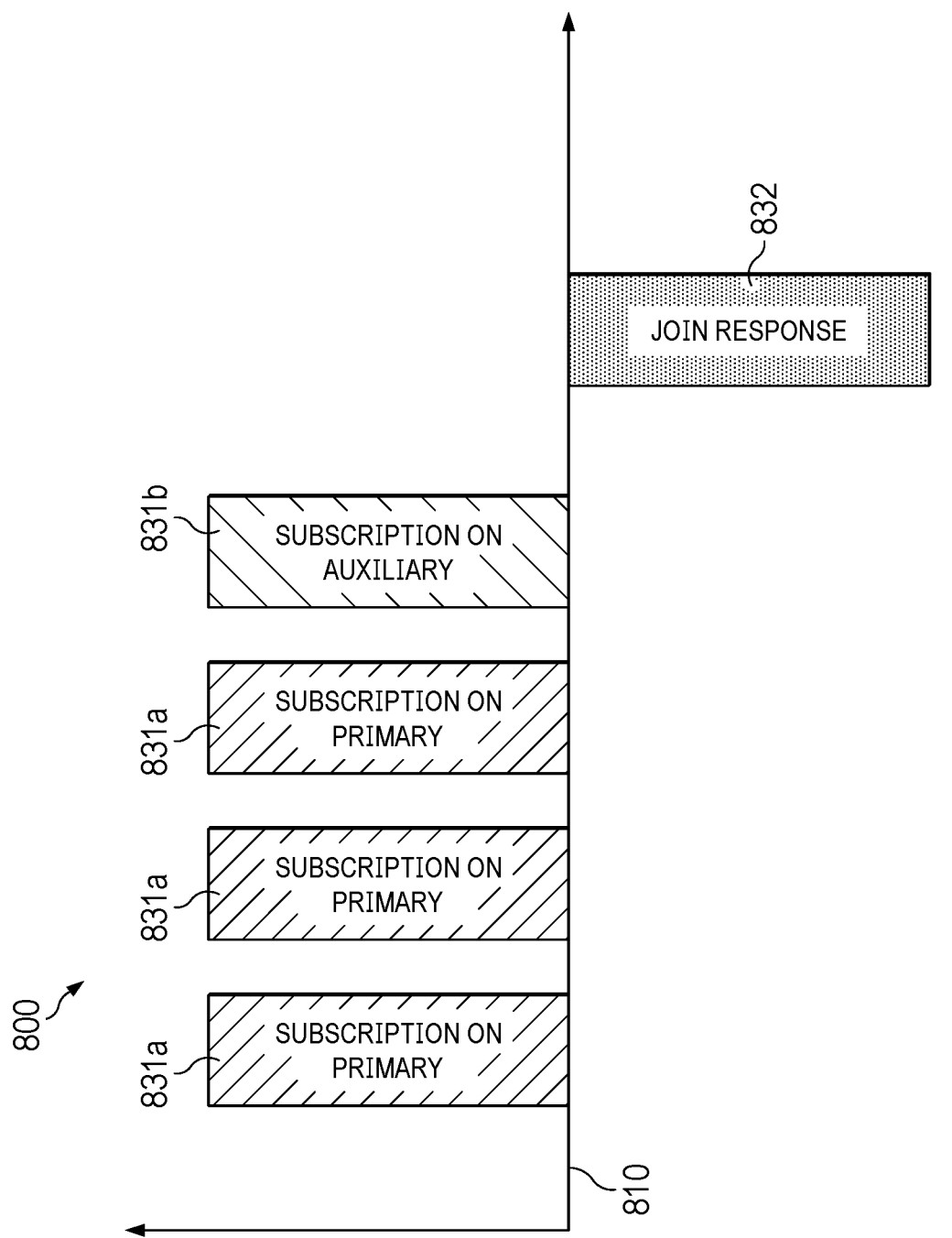
FIG. 8 is a message timing diagram of a message exchange for requesting a multicast service on an auxiliary channel, in accordance with various examples.

In other examples, a BLE device can broadcast a subscription request advertisement to receive multicast messages on different channels. FIG. 8 is a timing diagram of a message exchange 800 for requesting a multicast service on an auxiliary channel, in accordance with various examples. The message exchange 800 for establishing the multicast service is based on broadcasting a multicast subscription request advertisement message by a BLE device on a time axis 810. Messages below the time axis 810 indicate messages transmitted by the BLE device seeking to join a multicast group as a multicast client. Messages above the time axis 810 indicate messages from a multicast anchor.

To request the multicast service, a BLE device broadcasts subscription request advertisement messages 831a in a sequence of first time periods on a primary channel in a BLE network. The BLE device can also broadcast subscription request advertisement messages 831b in a sequence of second time periods on an auxiliary channel in the BLE network. The first time periods and the second time periods can have different time durations and can be separated by different respective time delays. The subscription request advertisement message 831a on the primary channel can include parameters to connect to the auxiliary channel. For example, the subscription request advertisement message 831a can include an identifier of the auxiliary channel of the subscription request advertisement message 831b. The subscription request advertisement message 831b can indicate a supported multicast service or a set of supported multicast services by the BLE device. The subscription request advertisement message 831b can also include device capabilities of the BLE device. If a multicast anchor receives the subscription request advertisement message 831a on the primary channel, the multicast anchor can switch to the auxiliary channel to receive the subscription request advertisement message 831b. In examples, the multicast anchor is configured to listen for the subscription request advertisement message 831a on the primary channel and the subscription request advertisement message 831b on the auxiliary channel.

If the multicast anchor receives the subscription request advertisement message 831b, the multicast anchor transmits a join response message 832 to the BLE device. The join response message 832 is a unicast message. The join response message 832 can include an identifier of the multicast group. The multicast anchor can transmit the join response message 832 on the auxiliary channel or the primary channel. The multicast anchor can establish the multicast service with at least one multicast client in the multicast group. After establishing the multicast service, the multicast anchor can transmit the multicast data in multicast messages to the multicast group on the auxiliary channel. Transmitting the multicast messages on the auxiliary channel can increase the bandwidth in the BLE network to transmit more multicast data for the multicast service.

To start transmitting multicast messages to a multicast group, a multicast anchor establishes multicast connection events according to the multicast connection parameters. The multicast connection events are time intervals for transmitting multicast messages (e.g., packets) which can be separated by equal time delays. For example, the multicast anchor can receive messages or packets from other BLE devices within the equal time delays. The multicast anchor 310 or 410 can transmit one or more multicast messages in each multicast connection event. The multicast anchor 310 or 410 can also set a maximum number of multicast messages or packets per multicast connection event. The number of multicast messages determine the time duration of the multicast connection event.

Figure 9:
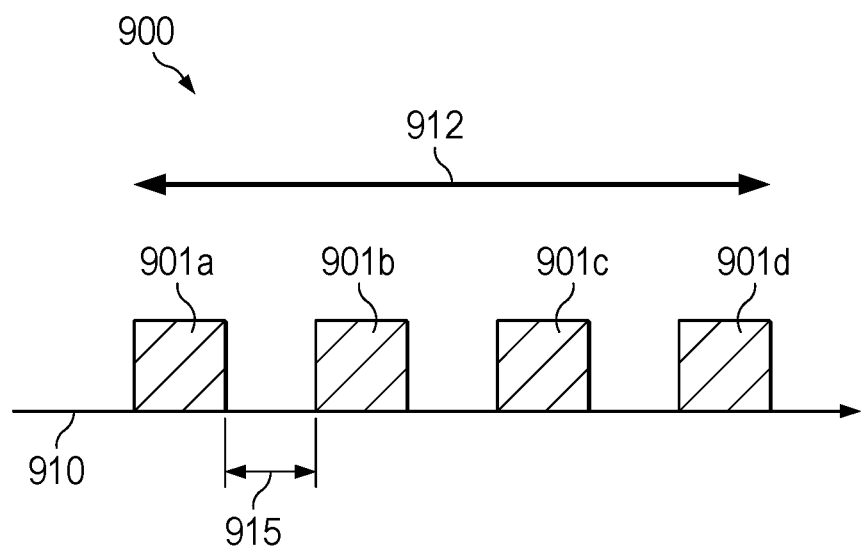
FIG. 9 is a message timing diagram of a multicast connection event including multicast messages, in accordance with various examples.

FIG. 9 is a message timing diagram of a multicast connection event 900 including multicast messages 901a-901d shown along a time axis 910, in accordance with various examples. A multicast anchor transmits the multicast messages 901a-901d in the multicast connection event 900 to a multicast group. The number of multicast messages 901a-901d determine a time duration 912 of the multicast connection event 900. The multicast messages 901a-901d can be separated by equal time delays 915. In examples, the time delays 915 between the multicast messages 901a-901d are approximately equal to 150 microseconds. For example, the multicast anchor transmits on a same channel the multicast messages 901a-901d within multicast connection events separated by a time period within 150 microseconds.

Figure 10:
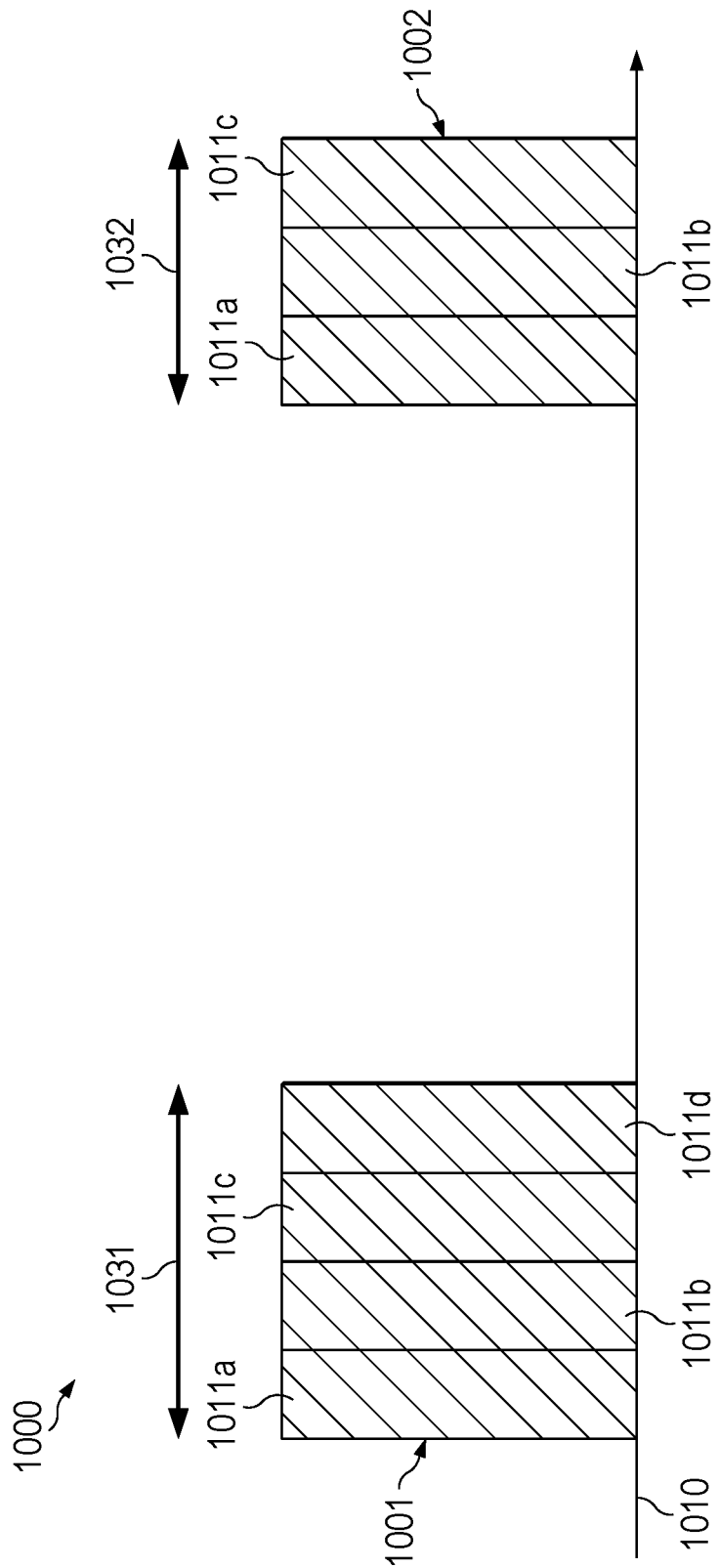
FIG. 10 is a message timing diagram of multicast connection events with different time durations to a multicast group, in accordance with various examples.

FIG. 10 is a message timing diagram of multicast connection events 1000 with different time durations to a multicast group, in accordance with various examples. The multicast connection events 1000 include a multicast connection event 1001 and a multicast connection event 1002. A multicast anchor transmits multicast messages 1011a-1011d, shown along a time axis 1010, to the multicast group in the multicast connection event 1001. The multicast anchor can retransmit the multicast messages 1011a-1011c in the multicast connection event 1002 to the multicast group. The time delays between the multicast messages are not shown in FIG. 10. Because the multicast connection event 1001 includes more multicast messages than the multicast connection event 1002, a first time duration 1031 of the multicast connection event 1001 can be longer than a second time duration 1032 of the multicast connection event 1002.

Figure 11:
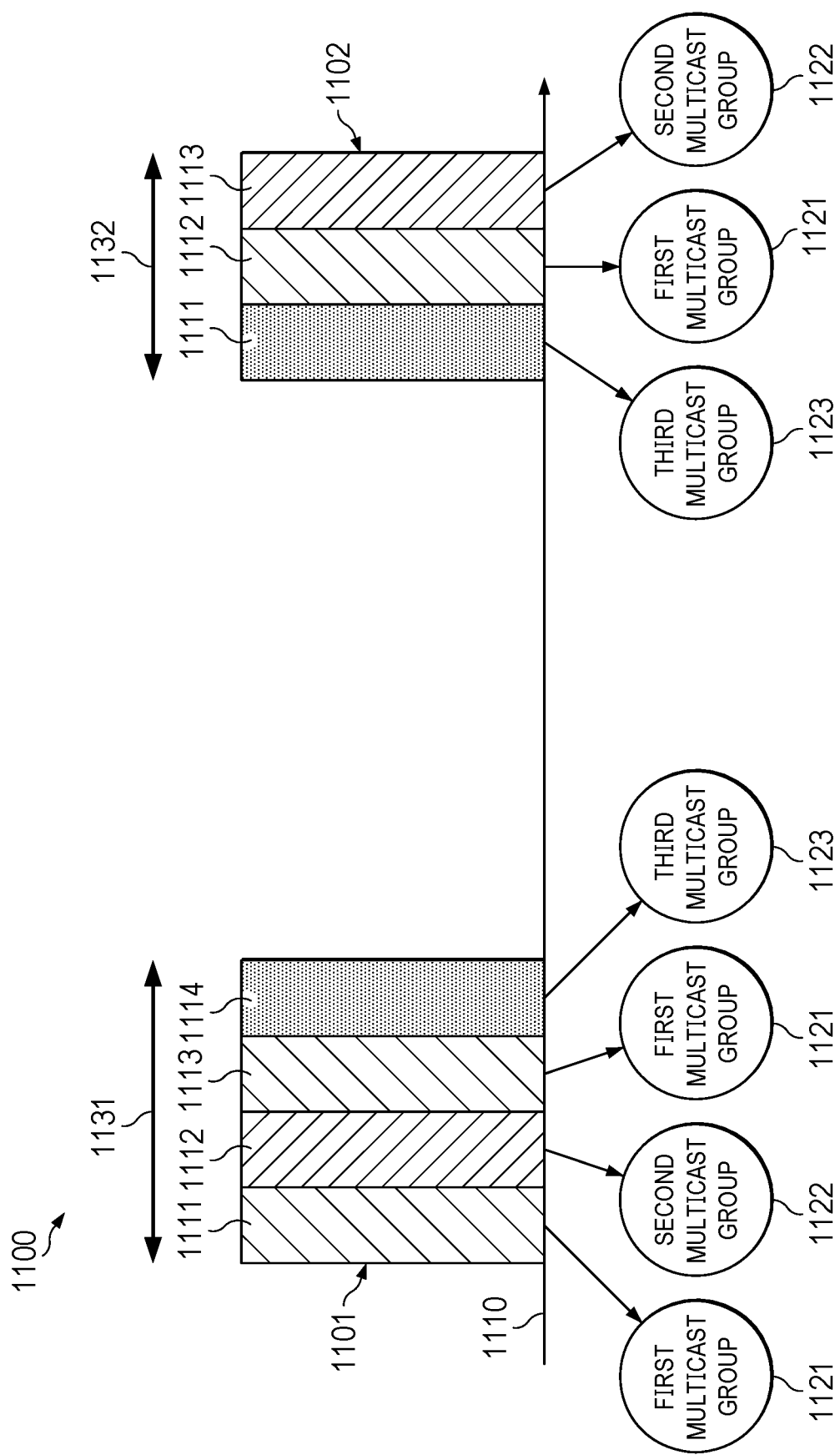
FIG. 11 is a message timing diagram of multicast connection events for multiple multicast groups, in accordance with various examples.

FIG. 11 is a message timing diagram of multicast connection events 1100 to multiple multicast groups, in accordance with various examples. The multicast connection events 1100 include a multicast connection event 1101 and a multicast connection event 1102. A multicast anchor transmits multicast messages 1111-1114, shown along a time axis 1110, to multiple multicast groups in the multicast connection event 1101. For example, the multicast anchor transmits, in the multicast connection event 1101, the multicast messages 1111 and 1113 to a multicast group 1121, the multicast message 1112 to a multicast group 1122, and the multicast message 1114 to a multicast group 1123. The multicast anchor can retransmit the multicast messages 1111-1113 to different multicast groups in the multicast connection event 1102. For example, the multicast anchor transmits, in the multicast connection event 1102, the multicast message 1111 to the multicast group 1123, the multicast message 1112 to the multicast group 1121, and the multicast message 1113 to the multicast group 1122. Because the multicast connection event 1101 includes more multicast messages than the multicast connection event 802, a time duration 1131 of the multicast connection event 1101 can be longer than a time duration 1132 of the multicast connection event 1102.

Figure 12:
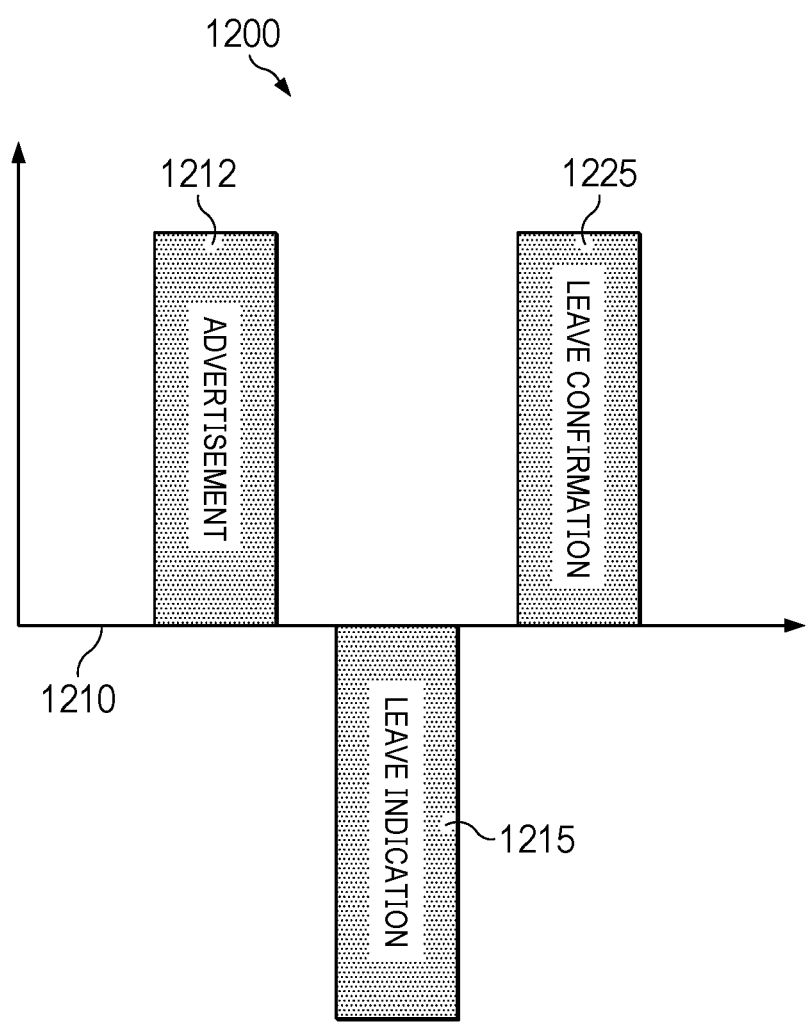
FIG. 12 is a message timing diagram of a message exchange for terminating a multicast service, in accordance with various examples.

FIG. 12 is a timing diagram of a message exchange 1200 for terminating a multicast service, in accordance with various examples. A multicast anchor can broadcast advertisement messages 1212, shown along a time axis 1210, in a sequence of time periods to surrounding BLE devices. Messages above the time axis 1210 indicate messages transmitted by the multicast anchor. Messages below the time axis 1210 indicate messages from a multicast client or a BLE device seeking to leave a multicast group. The multicast anchor can receive a leave indication message 1215 from a multicast client, such as between broadcasts of the advertisement messages 1212. The leave indication message 1215 can identify a multicast service or a multicast group, such as if the multicast service is associated with multiple multicast groups. Accordingly, the multicast anchor removes the multicast client from the multicast group and transmits a leave confirmation message 1225 to the multicast client. The leave indication message 1215 and the leave confirmation message 1225 are unicast messages.

Figure 13:
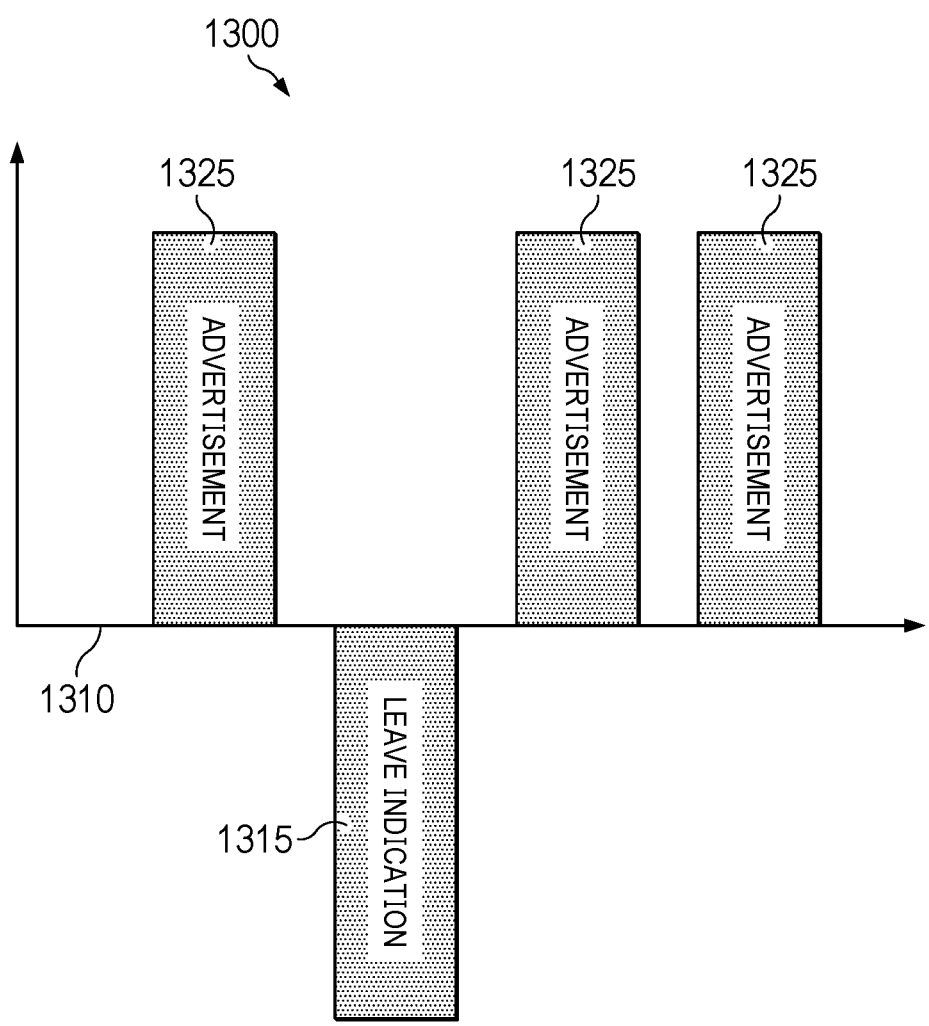
FIG. 13 is a message timing diagram of a message exchange for terminating a multicast service without a confirmation, in accordance with various examples.

In other examples, a multicast anchor can remove a multicast client from a multicast group without transmitting a leave confirmation message to the removed multicast client. FIG. 13 is a timing diagram of a message exchange 1300 for terminating a multicast service without a confirmation, in accordance with various examples. In this example, a multicast anchor can receive a leave indication message 1315 from a multicast client 1320, such as between broadcasts of advertisement messages 1325, shown along a time axis 1310. In response, the multicast anchor removes the multicast client from the multicast group and continues the broadcasts of the advertisement messages 1325 without transmitting a leave confirmation message to the multicast client.

Figure 14:
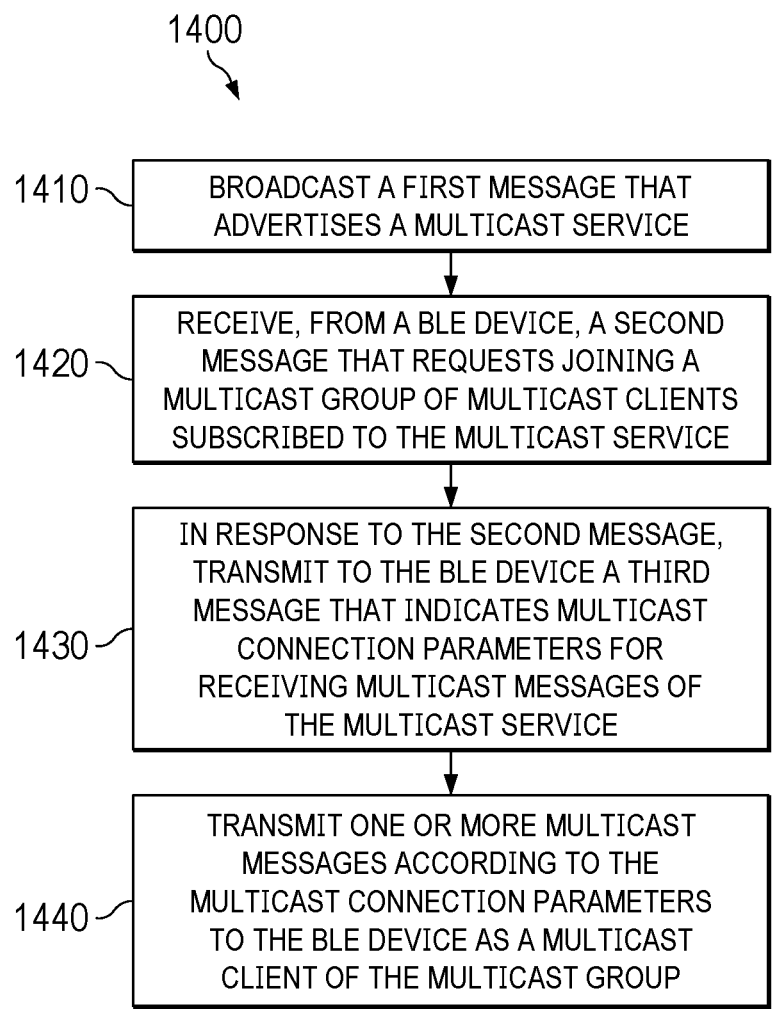
FIG. 14 is a flow diagram of a method for discovery and operation of a multicast service by a multicast anchor, in accordance with various examples.

FIG. 14 is a flow diagram of a method 1400 for discovery and operation of a multicast service by a multicast anchor, in accordance with various examples. The multicast discovery exchange in the method 1400 is based on broadcasting a multicast capability advertisement message by a multicast anchor. For example, the multicast anchor 310 can perform the method 1400 according to the message sequence diagram 300 for discovery and operation of a multicast service.

At a block 1410, the multicast anchor broadcasts a first message that advertises a multicast service, such as in a BLE network or to any surrounding devices (e.g. BLE devices). The first message is a multicast capability advertisement message that indicates a supported set of multicast services. At a block 1420, the multicast anchor receives from a device a second message that requests joining a multicast group of multicast clients to subscribe to the multicast service. The multicast group receives multicast messages of the multicast service. The second message is a unicast message from the device to the multicast anchor. At a block 1430, the multicast anchor transmits to the device, in response to the second message, a third message that indicates multicast connection parameters for receiving multicast messages of the multicast service. The third message is a unicast message from the multicast anchor to the device. At a block 1440, the multicast anchor transmits one or more multicast messages to the device as a multicast client of the multicast group according to the multicast connection parameters.

Figure 15:
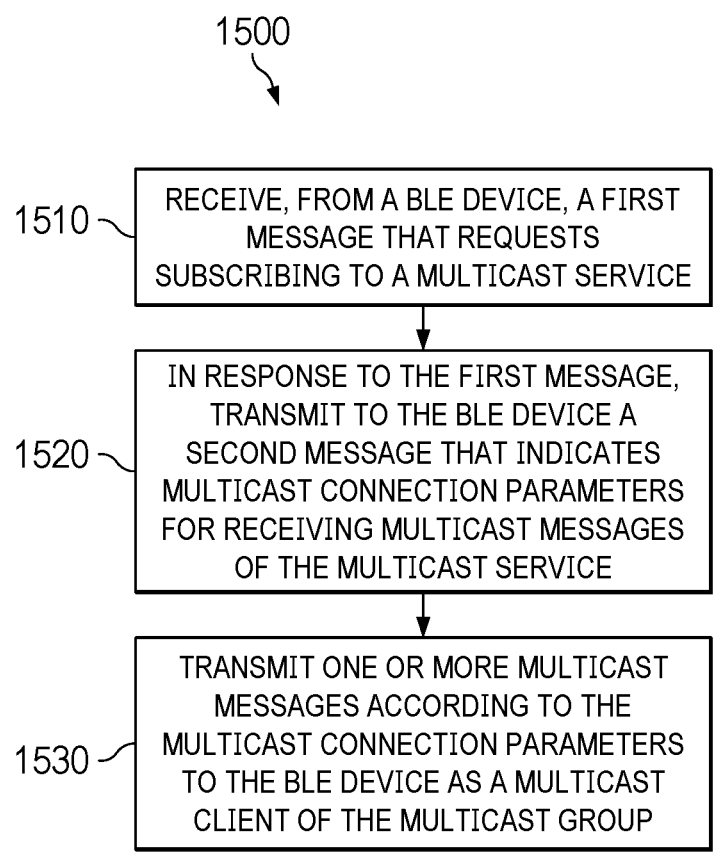
FIG. 15 is a flow diagram of a method for discovery and operation of a multicast service by a multicast anchor, in accordance with various examples.

FIG. 15 is a flow diagram of a method 1500 for discovery and operation of a multicast service by a multicast anchor, in accordance with various examples. The multicast discovery exchange in the method 1500 is based on receiving a multicast subscription request advertisement message broadcast from a BLE device. For example, the multicast anchor 410 can perform the method 1500 according to the message sequence diagram 400 for discovery and operation of a multicast service.

At a block 1510, the multicast anchor receives from a device a first message that requests subscribing to a multicast service. The first message is a subscription request advertisement message that indicates a set of multicast services that are supported by the device. The first message is a broadcast message sent from the device to surrounding device or in a BLE network. At a block 1520, the multicast anchor transmits to the device, in response to the first message, a second message that indicates multicast connection parameters for receiving multicast messages of the multicast service. The second message is a unicast message from the multicast anchor to the device. At a block 1530, the multicast anchor transmits one or more multicast messages to the device as a multicast client of a multicast group according to the multicast connection parameters.

Figure 16:
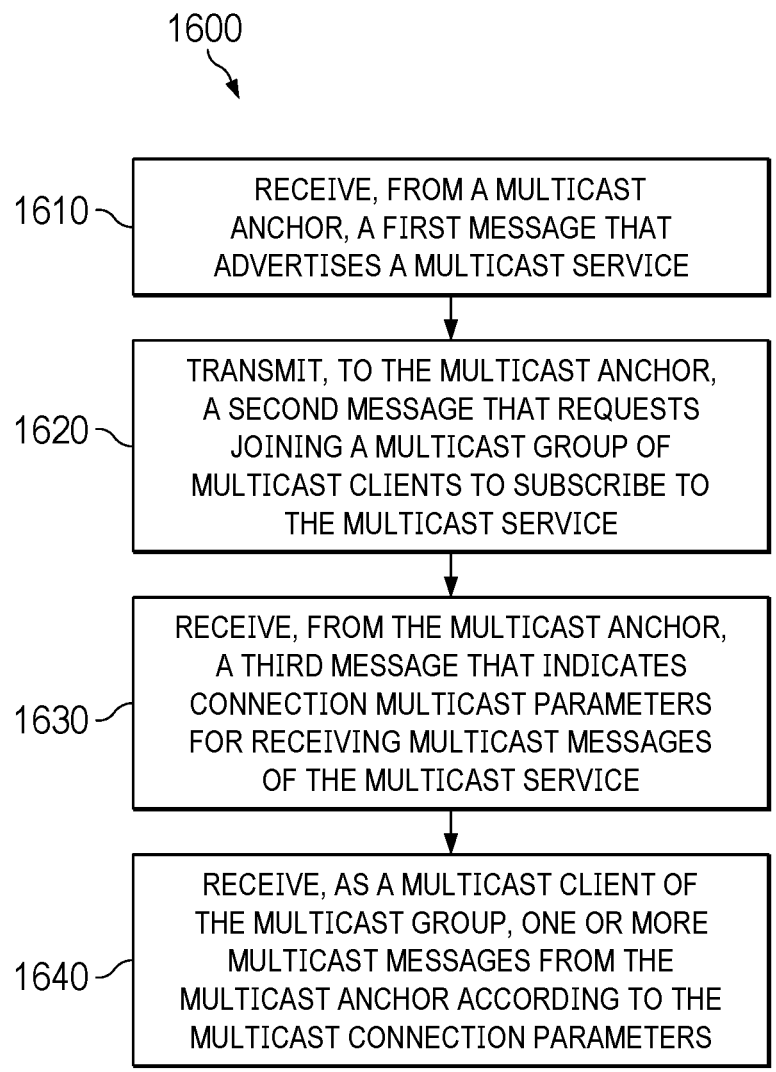
FIG. 16 is a flow diagram of a method for discovery and operation of a multicast service by a BLE device as a multicast client, in accordance with various examples.

FIG. 16 is a flow diagram of a method 1600 for discovery and operation of a multicast service by a device (e.g., a BLE device) as a multicast client, in accordance with various examples. The multicast discovery exchange in the method 1600 is based on receiving a multicast capability advertisement message broadcast from a multicast anchor. For example, the BLE device 320a or the BLE device 320b can perform the method 1600 according to the message sequence diagram 300 for discovery and operation of a multicast service.

At a block 1610, the device receives from a multicast anchor a first message that advertises a multicast service, such as in a BLE network. The first message is a broadcast message from the multicast anchor to any surrounding devices (e.g., BLE devices). The broadcast message is a multicast capability advertisement message that indicates a supported set of multicast services. At a block 1620, the device transmits to the multicast anchor a second message that requests joining a multicast group of multicast clients to subscribe to the multicast service. The multicast group receives multicast messages of the multicast service. The second message is a unicast message from the device to the multicast anchor. At a block 1630, the device receives from the multicast anchor, in response to the second message, a third message that indicates multicast connection parameters for receiving multicast messages of the multicast service.

The third message is a unicast message from the multicast anchor to the device. At a block 1640, the device receives, as a multicast client of the multicast group, one or more multicast messages from the multicast anchor according to the multicast connection parameters.

Figure 17:
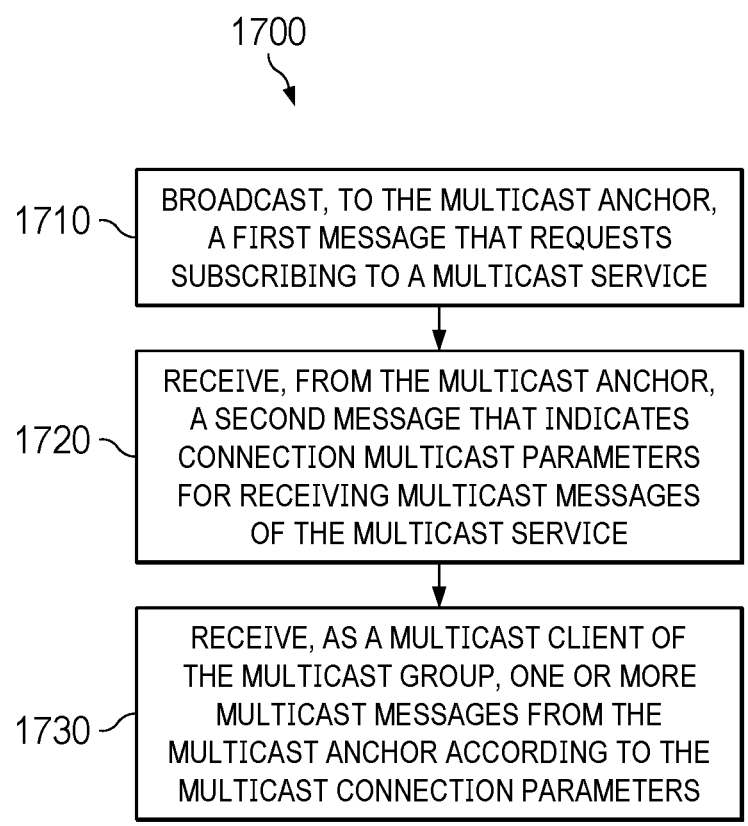
FIG. 17 is a flow diagram of a method for discovery and operation of a multicast service by a BLE device as a multicast client, in accordance with various examples.

FIG. 17 is a flow diagram of a method 1700 for discovery and operation of a multicast service by a device (e.g., a BLE device) as a multicast client, in accordance with various examples. The multicast discovery exchange in the method 1700 is based on broadcasting a multicast subscription request advertisement message by a BLE device. For example, the first BLE device 420*a* or the second BLE device 420*b* can perform the method 1700 according to the message sequence diagram 400 for discovery and operation of a multicast service.

At a block 1710, the device broadcasts a first message that requests subscribing to a multicast service. The first message is a subscription request advertisement message that indicates a set of multicast services that are supported by the device. At a block 1720, the device receives from the multicast anchor, in response to the first message, a second message that indicates multicast connection parameters for receiving multicast messages of the multicast service. The second message is a unicast message from the multicast anchor to the device. At a block 1730, the device receives, as a multicast client of the multicast group, one or more multicast messages from the multicast anchor according to the multicast connection parameters.

Figure 18:
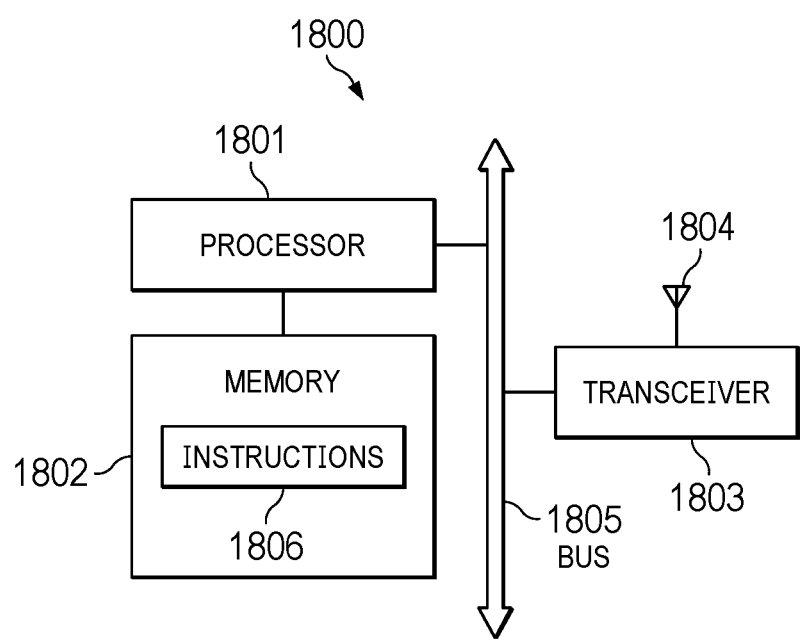
FIG. 18 is a block diagram of a processing and communication system in a device, in accordance with various examples.

FIG. 18 is a block diagram of a processing and communication system useful for processing and exchanging data such as messages in a device 1800, in accordance with various examples. The device 1800 may be a BLE device which is capable of establishing a connection to transmit and receive messages or packets in accordance with a BLE communication standard. For example, the device 1800 may be a central device, such as a router, a computer device, or a smartphone. In other examples, the device 1800 may be a peripheral device such as an Internet of Things (IoT) device, a sensor, a wearable device, a medical device, an automotive vehicle device, or other BLE device capable of establishing a wireless connection with a second BLE device or a network, such as the Internet. In some examples, the device 1800 may be a system on a chip (SoC), an electronic circuit board or a computer card of a BLE device.

The device 1800 includes hardware components for establishing a connection and transmitting and receiving data in accordance with the BLE communication standard. As shown in FIG. 18, the device 1800 may include one or more processors 1801 and one or more memories 1802. The device 1800 may also include one or more transceivers 1803 and one or more antennas 1804 for establishing wireless connections. These components may be coupled through a bus 1805, or in any other suitable manner. In FIG. 18, an example in which the components are coupled through a bus 1805 is shown.

The processor 1801 is configured to read and execute computer-readable instructions. For example, the processor 1801 is configured to invoke and execute instructions in a program stored in the memory 1802, including instructions 1806. Responsive to the processor 1801 transmitting data, the processor 1801 drives or controls the transceiver 1803 to perform the transmitting. The processor 1801 also drives or controls the transceiver 1803 to perform receiving, responsive to the processor 1801 receiving data. Therefore, the processor 1801 may be considered as a control center for performing transmitting or receiving data and the transceiver 1803 is an executor for performing the transmitting and receiving operations.

In some examples, the memory 1802 is coupled to the processor 1801 through the bus 1805. In other examples, the memory 1802 is integrated with the processor 1801. The memory 1802 is configured to store various software programs and/or multiple groups of instructions, including the instructions 1806. The memory 1802 may include one or more storage devices. For example, the memory 1802 includes a high-speed random-access memory and/or may include a nonvolatile memory such as one or more disk storage devices, a flash memory, another nonvolatile solid-state storage device, or a pseudostatic random-access memory (PSRAM). The memory 1802 may store an OS such as ANDROID, IOS, WINDOWS or LINUX. The memory 1802 may further store a network communications program. The network communications program is useful for performing communications with one or more attached devices, one or more user equipments, or one or more network devices. The memory 1802 may further store a user interface program. The user interface program displays content of an application through a graphical interface. The user interface can receive data or an operation performed by a user on the application via an input control such as a menu, a dialog box, or a physical input device (not shown). The memory 1802 is configured to store the instructions 1806 for implementing the various methods and processes provided in accordance with the various examples of this description.

In examples, the methods and processes can be implemented by a hardware integrated logical circuit in the device 1800 or the one or more processors 1801, or by the instructions 1806 such as in a form of software. For example, the memory 1802 can be a computer-readable storage medium configured to store the instructions 1806 as computer program instructions which can be executed by the one or more processors 1801. When the computer program instructions are executed by a processor 1801, the device 1800 is triggered to perform the methods, processes, or steps provided in the various examples of this description.

The transceiver 1803 includes a transmitter and a receiver. The transceiver 1803 is configured to transmit one or more signals that are provided by the processor 1801. The transceiver 1803 is also configured to receive one or more signals from other devices or equipments. In this example, the transceiver 1803 may be considered a wireless transceiver. The antenna 1804 may be configured to enable the exchanging of wireless communication signals between the transceiver 1803 and a network or another system or device.

The device 1800 may also include another communication component such as a Global Positioning System (GPS) module, cellular module, a BLUETOOTH or BLE module, Zigbee module, Long Term Evolution (LTE), LTE-Machine Type Communication (LTE-M), Narrow Band LTE (NB-LTE), Sub-Gigahertz Communication (sub 1G), EEE 802.15. 4, Wireless Sensor Networks (WSNs), WBMS or a Wireless Fidelity (WI-FI) module. The device 1800 may also support another wireless communication signal such as a satellite signal or a short-wave signal. The device 1800 may also be provided with a wired network interface or a local area network (LAN) interface to support wired communication.

In various examples, the device 1800 may further include an input/output interface (not shown) for enabling communications between the device 1800 and one or more input/output devices (not shown). Examples of the input/output devices include an audio input/output device, a key input device, a display and the like. The input/output devices are configured to implement interaction between the device 1800 and a user or an external environment. The input/output device may further include a camera, a touchscreen, a sensor, and the like. The input/output device communicates with the processor 1801 through a user interface.

The device 1800 shown in FIG. 18 is an example of a processing and communication system or device. During actual application, the device 1800 may include more or fewer components. The device 1800 may be part of a BLE device that is connected to other BLE devices.

Figure 19:
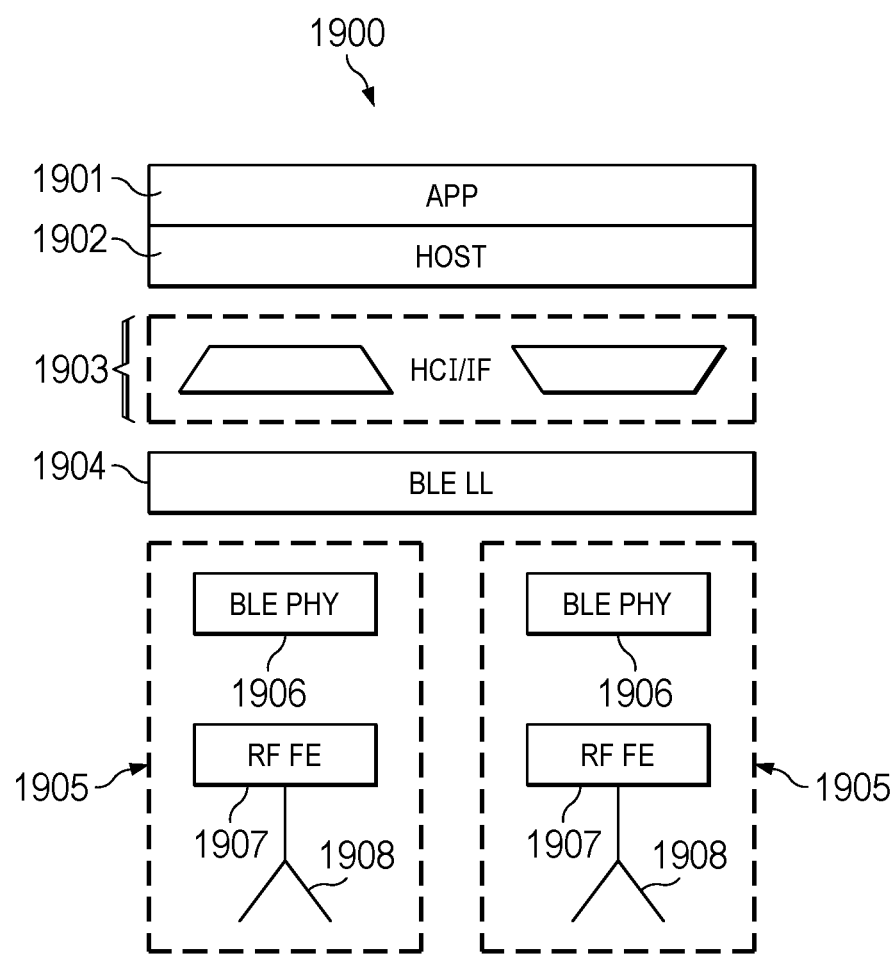
FIG. 19 is a diagram of a BLE device architecture for establishing BLE links, in accordance with various examples.

FIG. 19 is a diagram of a BLE device architecture 1900 useful for establishing BLE links, in accordance with various examples. The device BLE device architecture 1900 provides a BLE device with a capability of establishing a link with another BLE device via the device BLE PHY interface. For example, the link can be between a central device and a peripheral device. A multicast anchor can exchange unicast messages with a BLE device on the established link.

The BLE device architecture 1900 includes data handling blocks that are configured to process data and signals at different communication layers of a BLE protocol, according to the BLE communication standard. The data is processed and managed at the different communication layers in the arrangement order of the data handling blocks in the BLE device architecture 1900. The data handling blocks can be implemented via software, hardware such as a circuit, or both. The data handling blocks can include an application layer manager (APP) 1901, a host layer manager (Host) 1902, a HCl 1903, a BLE LL controller 1904, and one or more transceivers 1905, which can be coupled to each other in the order shown in FIG. 19. A transceiver 1905 includes a respective BLE PHY interface to the BLE LL controller 1904. Each transceiver 1905 includes a BLE PHY controller 1906, a radio frequency front end (RF FE) 1907, and a RF antenna 1908. The transceiver 1905 is configured to establish a respective link, transmit or receive data on the respective link, and manage the data at the signaling and RF levels.

The APP 1901 interacts with BLE applications and profiles and manages data accordingly. The APP 1901 processes the data of an application at the application level according to the application profile. For example, the BLE applications and profile are IoT applications and profiles. The Host 1902 interfaces with the APP 1901 and manages host device functions such as BLE device discovery, connection related services, security initiation, device pairing, security key exchange, data encapsulation, data attributes, or other application interface features. The HCl 1903 provides communication between the Host 1902 and the BLE LL controller 1904 via a suitable communication interface type, such as an application programming interface (API), a universal asynchronous receiver-transmitter (UART), a serial peripheral interface (SPI), or a universal serial bus (USB).

The BLE LL controller 1904 maintains links of the BLE link-cluster architecture 1900 with one or more connected BLE devices to process data associated with the links at the LL. The BLE LL controller 1904 also coordinates connection events on the links. This can include scheduling and/or exchanging coordination parameters with the other BLE devices. The coordination parameters can include the frequencies, the anchoring points, and the duration for each connection event of the links. The BLE LL controller 1904 also synchronizes packet transmission in the connection events. This can include determining and/or exchanging synchronization parameters with the other BLE devices. The synchronization parameters can include the direction (e.g., uplink or downlink), rate, power, and duration of packet transmissions on the links. The BLE LL controller 1904 may handle advertising, scanning, and creating or maintaining connections of the respective links. For example, the connections may be handled according to the transmission mode (e.g., unicast or broadcast) or according to the role of the BLE device (e.g., central or peripheral device, advertiser or scanner, broadcaster or observer). Examples of the LL states include scanning, advertising, initiating, connection, synchronization and standby states.

The transceiver 1905 provides a BLE PHY interface to the BLE LL controller 1904. In each transceiver 1905 that establishes a respective link, the BLE PHY controller 1906 manages data exchange in a form of messages or packets on the link and interfaces with the BLE LL controller 1904. The BLE PHY controller 1906 processes the data at the PHY layer including modulating the data for transmission according to a modulation scheme at a certain data rate and a certain frequency. The BLE PHY controller 1906 also synchronizes packet transmission in connection events on the link. The synchronization includes configuring, according to the packet synchronization parameters, the direction (e.g., uplink or downlink), the rate, the power, and the duration of the transmission of packets in the coordinated connection events on the link. The RF FE 1907 manages transmission and reflection of the data via the RF antenna 1908. The data signals may be transmitted or received at different channels.

The term "couple" appears throughout the specification. The term may cover connections, communications or signal paths that enable a functional relationship consistent with this description. For example, if device A provides a signal to control device B to perform an action, in a first example device A is coupled to device B or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device or a combination thereof.

An architecture or device that is described herein as including certain components may instead be coupled to those components to form the described architecture or device. Unless otherwise stated, "about," "approximately," or "substantially" preceding a value means +/−10 percent of the stated value.

Modifications are possible in the described examples, and other examples are possible within the scope of the claims.

What is claimed is:

1. A method, comprising:
broadcasting, by a first device, a first message that advertises a multicast service, and the first message indicates multicast group capabilities associated with a multicast group;
receiving, by the first device, a unicast message that indicates a request to join a second device to the multicast group;

joining, by the first device, the second device to the multicast group as a multicast client;

determining, by the first device, multicast connection parameters for receiving one or more multicast messages for the multicast group based on the multicast group capabilities; and transmitting, by the first device, the one or more multicast messages for the multicast group.

2. The method of claim 1, wherein the one or more multicast messages are transmitted according to the multicast connection parameters.

3. The method of claim 1, further comprising repeating the broadcasting of the first message with 300 microsecond delays during switching broadcasting the first message from a primary channel to an auxiliary channel.

4. The method of claim 1, further comprising:

receiving, by the first device, a second unicast message that indicates a request to leave the multicast group; and ending transmitting the multicast messages responsive to the multicast group being empty of multicast clients.

5. The method of claim 4, further comprising transmitting, by the first device in response to the second unicast message, a third unicast message that confirms the request to leave the multicast group.

6. The method of claim 1, wherein the first device is a central device.

7. The method of claim 6, further comprising transmitting, by the first device in response to the second unicast message, a third unicast message that confirms the request to leave the multicast group.

8. The method of claim 1, wherein the first device is a peripheral device.

9. A method, comprising:

broadcasting, by a first device, a first message that advertises a multicast service for a multicast group;

receiving, by the first device, a unicast message that indicates a request to join a second device to the multicast group;

joining, by the first device, the second device to the multicast group as a multicast client;

transmitting, by the first device, one or more multicast messages for the multicast group, wherein broadcasting the first message that advertises the multicast service is performed on a first channel, and wherein the first message indicates a second channel for receiving the multicast messages; and broadcasting on the second channel, by the first device, a second message that advertises the multicast service, wherein the second message includes multicast connection parameters for receiving the one or more multicast messages for the multicast group on the second channel.

10. The method of claim 9, wherein the unicast message is received on the second channel.

11. The method of claim 9, wherein the multicast connection parameters include timing information for receiving the multicast messages on the second channel.

12. The method of claim 9, wherein the first device is a central device.

13. The method of claim 9, wherein the first device a peripheral device.

14. The method of claim 9, further comprising:

receiving, by the first device, a second unicast message that indicates a request to leave the multicast group; and ending transmitting the multicast messages responsive to the multicast group being empty of multicast clients.

15. A device comprising:

a transceiver; and processing circuitry configurable to:

broadcast, via the transceiver, a first message that advertises a multicast service and the first message indicates multicast group capabilities associated with a multicast group;

receive, via the transceiver, a unicast message that indicates a request to join another device to the multicast group;

join the another device to the multicast group as a multicast client;

determine multicast connection parameters for receiving one or more multicast messages for the multicast group based on the multicast group capabilities; and transmit, via the transceiver, the one or more multicast messages for the multicast group.

16. The device of claim 15, wherein the processing circuitry is further configurable to:

responsive to the unicast message, transmit a second unicast message that indicates multicast connection parameters for receiving the one or more multicast messages for the multicast group.

17. The device of claim 16, wherein the processing circuitry is configurable to transmit the one or more multicast messages according to the multicast connection parameters.

18. The device of claim 15, wherein the processing circuitry is further configurable to:

repeat the broadcasting of the first message with 300 microsecond delays during switching broadcasting the first message from a first channel to a second channel.

19. The device of claim 15, wherein the processing circuitry is further configurable to:

receive a second unicast message that indicates a request to leave the multicast group; and end transmitting the one or more multicast messages responsive to the multicast group being empty of multicast clients.

20. The device of claim 19, wherein the processing circuitry is further configurable to:

transmit, in response to the second unicast message, a third unicast message that confirms the request to leave the multicast group.

* * * * *